United States Patent
Rothman et al.

(10) Patent No.: US 9,943,860 B2
(45) Date of Patent: Apr. 17, 2018

(54) MINERAL RECOVERY IN TAILINGS USING FUNCTIONALIZED POLYMERS

(75) Inventors: Paul J. Rothman, Windsor, CT (US); Mark R. Fernald, Enfield, CT (US); Francis K. Didden, Wallingford, CT (US); Christian V. O'Keefe, Durham, CT (US); Alan D. Kersey, South Glastonbury, CT (US); Douglas H. Adamson, Mansfield Center, CT (US)

(73) Assignee: CiDRA Corporate Services Inc., Wallingford, CT (US)

(*) Notice: Subject to any disclaimer, the term of this patent is extended or adjusted under 35 U.S.C. 154(b) by 770 days.

(21) Appl. No.: 14/119,013

(22) PCT Filed: May 25, 2012

(86) PCT No.: PCT/US2012/039655
§ 371 (c)(1),
(2), (4) Date: Mar. 23, 2015

(87) PCT Pub. No.: WO2013/074150
PCT Pub. Date: May 23, 2013

(65) Prior Publication Data
US 2015/0209799 A1 Jul. 30, 2015

Related U.S. Application Data

(60) Provisional application No. 61/489,893, filed on May 25, 2011, provisional application No. 61/533,544, filed on Sep. 12, 2011.

(51) Int. Cl.
*B01D 37/02* (2006.01)
*B03C 5/00* (2006.01)
(Continued)

(52) U.S. Cl.
CPC .............. *B03C 5/00* (2013.01); *B01D 15/02* (2013.01); *B01D 37/02* (2013.01); *B01D 39/00* (2013.01);
(Continued)

(58) Field of Classification Search
CPC ........ B03D 1/016; B03D 1/023; B03D 1/082; B03D 1/10; B03D 1/1462; B03D 2203/02;
(Continued)

(56) References Cited

U.S. PATENT DOCUMENTS

| 1,684,536 A | 9/1928 | Fischer |
| 2,585,473 A | 2/1952 | Kennedy |

(Continued)

FOREIGN PATENT DOCUMENTS

| CN | 1011778957 | 7/2010 |
| CN | 101970119 | 2/2011 |

(Continued)

OTHER PUBLICATIONS

SU118472 English Language Translation (2 pages).
(Continued)

*Primary Examiner* — Joseph C Rodriguez
(74) *Attorney, Agent, or Firm* — Ware, Fressola, Maguire & Barber LLP

(57) ABSTRACT

An apparatus and method for collecting mineral particles in the tailings is disclosed. The apparatus may take the form of a filter, a conveyor belt, a collection plate or an impeller configured to contact with tailings of a flotation process, before and/or after the tailings are discharged into a pond. The filter, conveyor belt, collection plate or impeller has a collection area or surface made of, or coated with, a synthetic material having a functional group, e.g., having an ionizing bond to attract the mineral particles of interest.

(Continued)

Alternatively, the synthetic material has hydrophobic molecules to render the collection area hydrophobic. When the mineral particles of interest in the tailings are combined with collector molecules, the mineral particles of interest may also become hydrophobic. The hydrophobic mineral particles of interest are attracted to the hydrophobic collection area or surface. The filter, conveyor belt, collection plate and impeller may have a plurality of passage ways or synthetic beads in order to increase the contacting surfaces.

24 Claims, 22 Drawing Sheets

(51) Int. Cl.

| | | |
|---|---|---|
| B04C 1/00 | (2006.01) | |
| B07B 1/00 | (2006.01) | |
| B03B 1/04 | (2006.01) | |
| B03D 1/02 | (2006.01) | |
| C02F 1/24 | (2006.01) | |
| B03D 1/14 | (2006.01) | |
| B01D 39/00 | (2006.01) | |
| C22B 15/00 | (2006.01) | |
| B01D 15/02 | (2006.01) | |
| B03D 1/016 | (2006.01) | |
| B03C 1/01 | (2006.01) | |
| B03C 5/02 | (2006.01) | |

(52) U.S. Cl.
CPC .............. *B03B 1/04* (2013.01); *B03C 1/01* (2013.01); *B03C 5/02* (2013.01); *B03D 1/016* (2013.01); *B03D 1/023* (2013.01); *B03D 1/14* (2013.01); *B04C 1/00* (2013.01); *B07B 1/00* (2013.01); *C02F 1/24* (2013.01); *C22B 15/0063* (2013.01); *Y10T 428/2982* (2015.01)

(58) Field of Classification Search
CPC .. B01D 37/02; B01D 2259/816; B01D 15/26; B07B 2230/04
See application file for complete search history.

(56) References Cited

U.S. PATENT DOCUMENTS

| | | | |
|---|---|---|---|
| 2,588,976 A | 3/1952 | Fuhrmeister, Jr. | |
| 2,678,132 A | 5/1954 | Beard, Jr. | |
| 2,699,872 A | 1/1955 | Kelsey | |
| 3,224,582 A | 12/1965 | Iannicelli | |
| 3,796,308 A | 3/1974 | McIlhinney et al. | |
| 3,868,318 A | 2/1975 | Clark et al. | |
| 3,970,518 A | 7/1976 | Giaever | |
| 4,100,242 A | 7/1978 | Leach | |
| 4,177,253 A | 12/1979 | Davies et al. | |
| RE30,360 E | 8/1980 | Shubert | |
| 4,224,138 A | 9/1980 | Kruyer | |
| 4,235,562 A | 11/1980 | Ribas | |
| 4,236,995 A | 12/1980 | Kruyer | |
| 4,269,699 A | 5/1981 | McCready et al. | |
| 4,313,832 A | 2/1982 | Shimizu et al. | |
| 4,358,368 A | 11/1982 | Hellsten et al. | |
| 4,363,749 A | 12/1982 | Weiss et al. | |
| 4,391,608 A * | 7/1983 | Dondelewski ............ C10L 9/00 | |
| | | | 201/17 |
| 4,412,843 A | 11/1983 | Burgess et al. | |
| 4,511,461 A | 4/1985 | Kruyer | |
| 4,532,032 A * | 7/1985 | Ng ........................ B03D 1/008 | |
| | | | 209/166 |
| 4,537,599 A * | 8/1985 | Greenwald, Sr. ........ B03B 1/04 | |
| | | | 209/164 |
| 4,556,482 A | 12/1985 | Nagaraj | |
| 4,657,666 A * | 4/1987 | Snook ...................... B03C 1/01 | |
| | | | 209/214 |
| 4,685,963 A | 8/1987 | Saville | |
| 4,888,106 A | 12/1989 | Lipp et al. | |
| 4,956,077 A | 9/1990 | Barwise | |
| 4,971,685 A | 11/1990 | Stanley et al. | |
| 4,981,582 A | 1/1991 | Yoon et al. | |
| 5,161,694 A | 11/1992 | Yoon et al. | |
| 5,167,798 A | 12/1992 | Yoon et al. | |
| 5,192,423 A | 3/1993 | Duczmal et al. | |
| 5,256,298 A | 10/1993 | Powell | |
| 5,603,841 A | 2/1997 | Kerr | |
| 5,670,056 A | 9/1997 | Yoon et al. | |
| 5,965,117 A | 10/1999 | Howard, Jr. et al. | |
| 6,234,318 B1 | 5/2001 | Breau et al. | |
| 6,312,603 B1 | 11/2001 | Nishizawa | |
| 6,319,407 B1 | 11/2001 | Maatta et al. | |
| 6,799,682 B1 | 10/2004 | Yoon | |
| 6,871,743 B2 | 3/2005 | Yoon | |
| 6,890,431 B1 | 5/2005 | Eades et al. | |
| 7,264,728 B2 | 9/2007 | Gibson et al. | |
| 7,285,219 B2 | 10/2007 | Kolesinski | |
| 7,426,852 B1 | 9/2008 | Rothman | |
| 7,488,418 B2 | 2/2009 | Miller | |
| 7,641,863 B2 | 1/2010 | Doktycz et al. | |
| 7,686,960 B2 | 3/2010 | Cort | |
| 7,759,123 B2 * | 7/2010 | Call ........................ B07B 7/00 | |
| | | | 422/83 |
| 7,891,213 B2 | 2/2011 | Bogdahn et al. | |
| 8,007,754 B2 | 8/2011 | Yoon et al. | |
| 8,349,188 B2 * | 1/2013 | Soane ...................... C02F 1/40 | |
| | | | 210/666 |
| 8,408,395 B2 * | 4/2013 | Domke ..................... B03C 1/01 | |
| | | | 209/47 |
| 9,302,270 B2 * | 4/2016 | Rothman ............... B01D 15/02 | |
| 9,327,294 B2 * | 5/2016 | Rothman ................. B03B 1/04 | |
| 9,566,613 B2 * | 2/2017 | Kodama ................. B07B 1/38 | |
| 9,731,221 B2 * | 8/2017 | Rothman ............... B01D 15/26 | |
| 9,827,574 B2 * | 11/2017 | Rothman .................. B03C 5/00 | |
| 9,839,919 B2 * | 12/2017 | Davis ................... B03D 1/1437 | |
| 2001/0008617 A1 | 7/2001 | Robles | |
| 2003/0104359 A1 | 6/2003 | Cuthbertson et al. | |
| 2003/0225231 A1 | 12/2003 | Hall | |
| 2004/0000523 A1 | 1/2004 | Rosenberg et al. | |
| 2004/0173506 A1 | 9/2004 | Doktycz et al. | |
| 2005/0029195 A1 | 2/2005 | Gibson et al. | |
| 2005/0029204 A1 | 2/2005 | Schwartzkopf | |
| 2005/0051465 A1 | 3/2005 | Khan et al. | |
| 2005/0139551 A1 | 6/2005 | Yoon | |
| 2005/0155415 A1 | 7/2005 | Kurkowski et al. | |
| 2005/0242000 A1 | 11/2005 | Khan et al. | |
| 2006/0113259 A1 | 6/2006 | Brunone | |
| 2006/0151397 A1 | 7/2006 | Wright et al. | |
| 2006/0226051 A1 | 10/2006 | Navarrette et al. | |
| 2006/0263516 A1 | 11/2006 | Jones et al. | |
| 2006/0283516 A1 | 12/2006 | Nagaoka et al. | |
| 2008/0139399 A1 | 6/2008 | Fonnum et al. | |
| 2008/0156702 A1 | 7/2008 | Willem | |
| 2008/0290029 A1 | 11/2008 | Croue et al. | |
| 2009/0061226 A1 | 3/2009 | Banin et al. | |
| 2009/0139906 A1 | 6/2009 | Kruyer | |
| 2009/0173668 A1 | 7/2009 | Duyvesteyn et al. | |
| 2009/0206040 A1 | 8/2009 | Berg et al. | |
| 2009/0267275 A1 | 10/2009 | Birken | |
| 2009/0301972 A1 | 12/2009 | Hines et al. | |
| 2010/0059449 A1 | 3/2010 | Grass et al. | |
| 2010/0072110 A1 | 3/2010 | Gradek | |
| 2010/0108573 A1 | 5/2010 | Ravishankar et al. | |
| 2010/0200510 A1 * | 8/2010 | Domke .................... B03C 1/01 | |
| | | | 210/679 |
| 2010/0228056 A1 | 9/2010 | Wang et al. | |
| 2010/0279322 A1 | 11/2010 | Tang et al. | |
| 2010/0285606 A1 | 11/2010 | Phillips et al. | |
| 2010/0294725 A1 | 11/2010 | Bush et al. | |
| 2010/0300941 A1 | 12/2010 | Domke et al. | |
| 2011/0114566 A1 | 5/2011 | McCaw et al. | |
| 2011/0120919 A1 | 5/2011 | Domke et al. | |
| 2011/0120954 A1 * | 5/2011 | Domke ................... B03C 1/015 | |
| | | | 210/695 |

(56) References Cited

U.S. PATENT DOCUMENTS

| | | |
|---|---|---|
| 2011/0131873 A1 | 6/2011 | Soane et al. |
| 2011/0174696 A1* | 7/2011 | Young .................. B03D 1/02 209/18 |
| 2012/0029120 A1 | 2/2012 | Soane et al. |
| 2012/0076694 A1 | 3/2012 | Morozov et al. |
| 2012/0091000 A1 | 4/2012 | Taylor et al. |
| 2013/0140218 A1* | 6/2013 | Dobby .................. B03D 1/087 209/164 |
| 2014/0202959 A1* | 7/2014 | Rothman ............... B03B 1/04 210/660 |
| 2014/0227520 A1* | 8/2014 | Rothman ............... B01D 37/02 428/402 |
| 2017/0080403 A1* | 3/2017 | Rothman ............... B01J 20/261 |

FOREIGN PATENT DOCUMENTS

| | | |
|---|---|---|
| EP | 0164237 | 12/1980 |
| EP | 0163480 | 12/1985 |
| EP | 0348620 | 1/1990 |
| EP | 1184064 | 3/2002 |
| EP | 2313200 | 4/2011 |
| EP | 2714055 A1 | 4/2014 |
| GB | 1339337 | 12/1973 |
| KZ | 22494 | 5/2010 |
| RU | 1558473 | 4/1990 |
| RU | 2038155 | 6/1995 |
| RU | 2063813 | 7/1996 |
| RU | 2091141 | 9/1997 |
| SU | 118472 | 1/1959 |
| SU | 441314 | 8/1974 |
| WO | 8301397 | 4/1983 |
| WO | 8404701 | 12/1984 |
| WO | 8910202 A1 | 11/1989 |
| WO | 9211091 | 7/1992 |
| WO | 02066168 | 8/2002 |
| WO | 2004064997 | 8/2004 |
| WO | 2005066631 | 7/2005 |
| WO | 2007098115 | 8/2007 |
| WO | 2008055371 | 5/2008 |
| WO | 2009052362 | 4/2009 |
| WO | 2010007157 | 1/2010 |
| WO | 2010098786 | 9/2010 |
| WO | 2011091522 | 8/2011 |

OTHER PUBLICATIONS

Decision on Granting issued by the Russian Patent Office in counterpart Russian application 2013157534 dated Feb. 4, 2016 (8 pages).

"The process of separation of fine mineral particles by flotation with hydrophobic polymeric carrier" by Jorge Rubio et al, International Journal of Mineral Processing, vol. 37, No. 1-2, Jan. 1, 1993, pp. 109-122.

Wyss et al. "A novel approach for the extraction of herbicides and pesticides from water using liquid-core microcapsules" by Wyss et al. Biotechnology and Engineering; Aug. 19, 2004; abstract, 3 pages.

Krishna et al. "Synthesis of xanthate functionalized silica gel and its application for the preconcentration and separation of uranium (VI) from inorganic components." Journal of Radioanalytical and Nuclear Chemistry. vol. 266, No. 2 (2005) 251-257.

Brown et al. Magnetic Control over Liquid Surface Properties with Responsive Surfactants. Angew. Chem. Int. Ed. 51: 1-4, 2012 (retrieved on Apr. 6, 2013). Retrieved from the Internet. <URL: http://www.magneticmicrosphere.com/ckfinder/userfiles/files/Brown_magnetic_detergent_2012.pdf>. entire document.

Nimittrakoolchai et al., Deposition of transparent, hydrophobic polydimethylsiloxane—nanocrystalline TiO2 hybrid films on glass substrate, Sep. 28, 2007, Songklanakarin, pp. 1, 2 and 6.

Please see excerpt from p. 2/15 of a 4th Office Action issued by the State Intellectual Property Office dated Jul. 21, 2016 showing relevance of p. 338 of Application of Polymer in Concrete, Aug. 31, 2003.

Application of polymer in concrete, Shiyun Zhong, et al., Chemical industry press, published on Aug. 31, 2003, p. 338.

\* cited by examiner

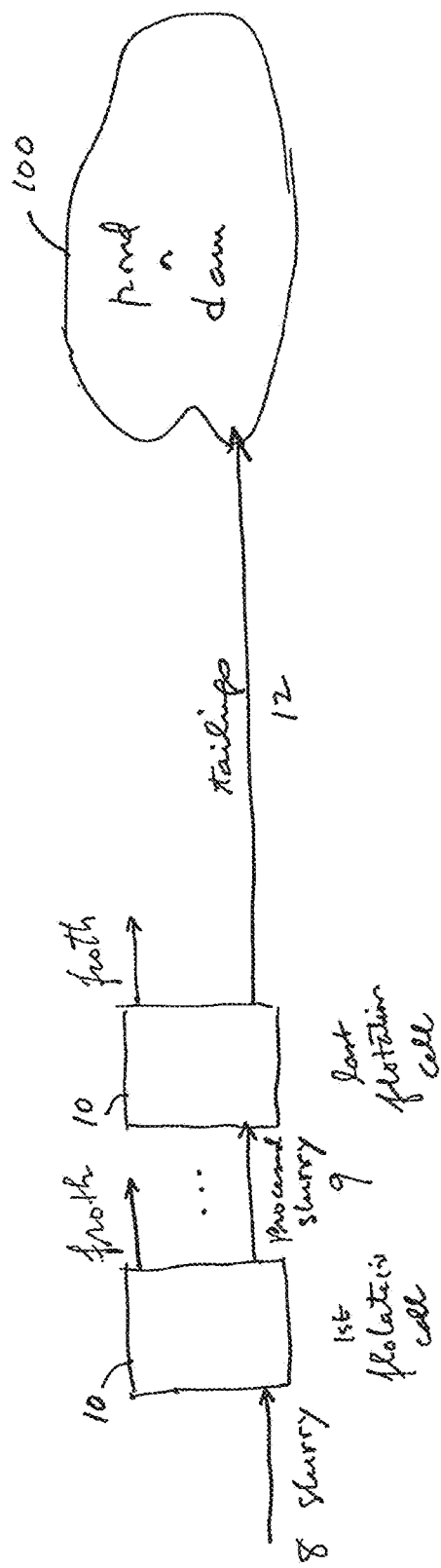

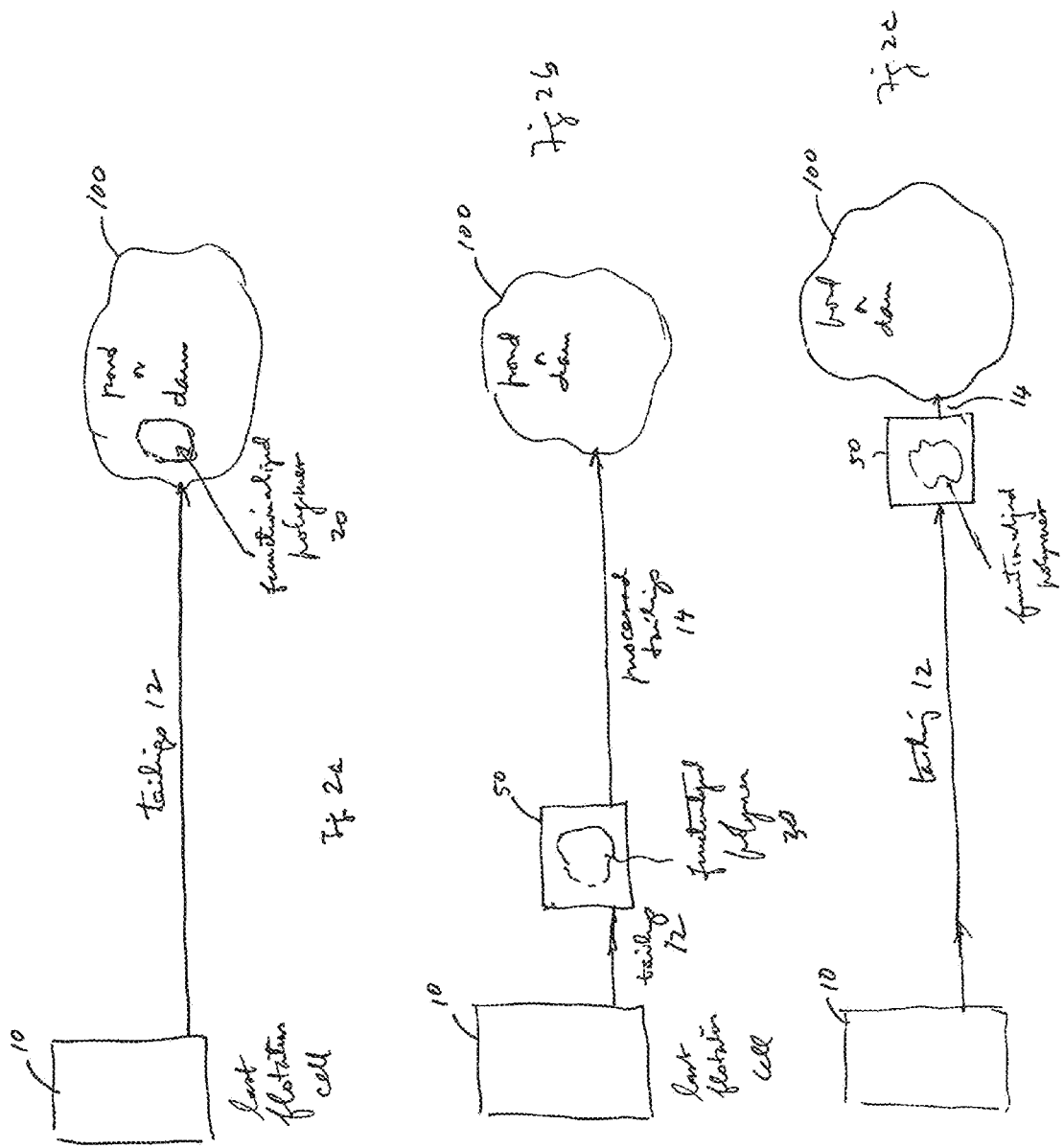

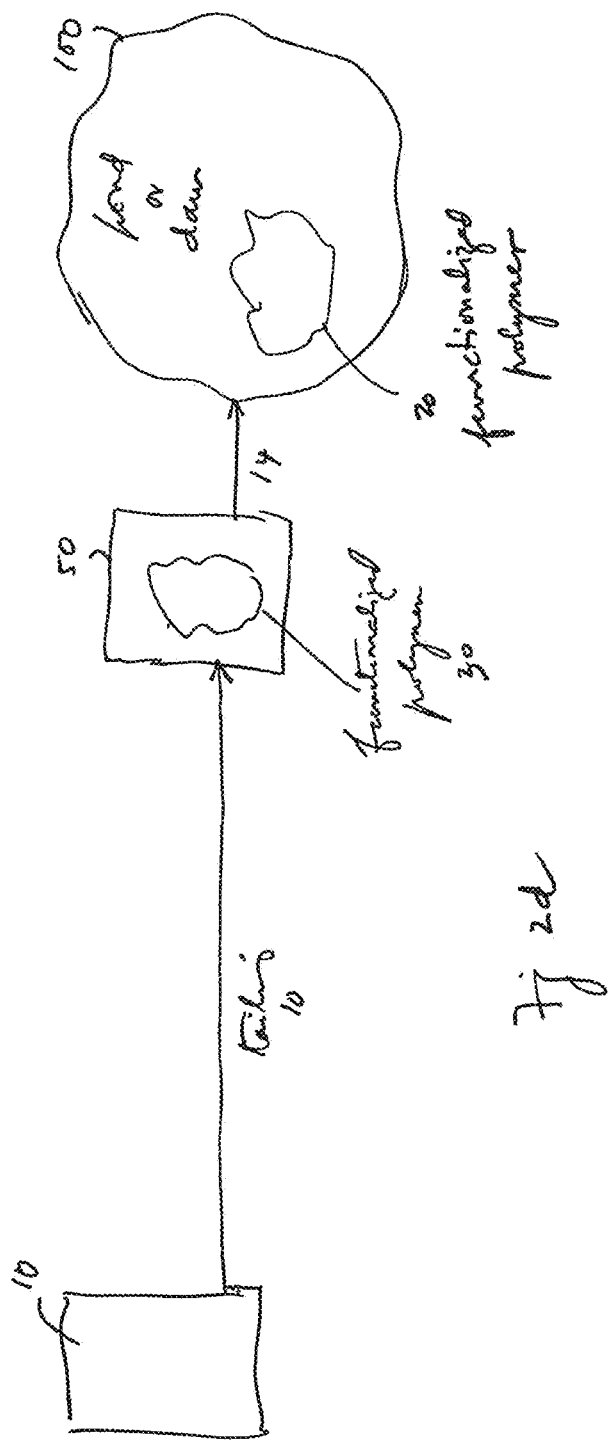

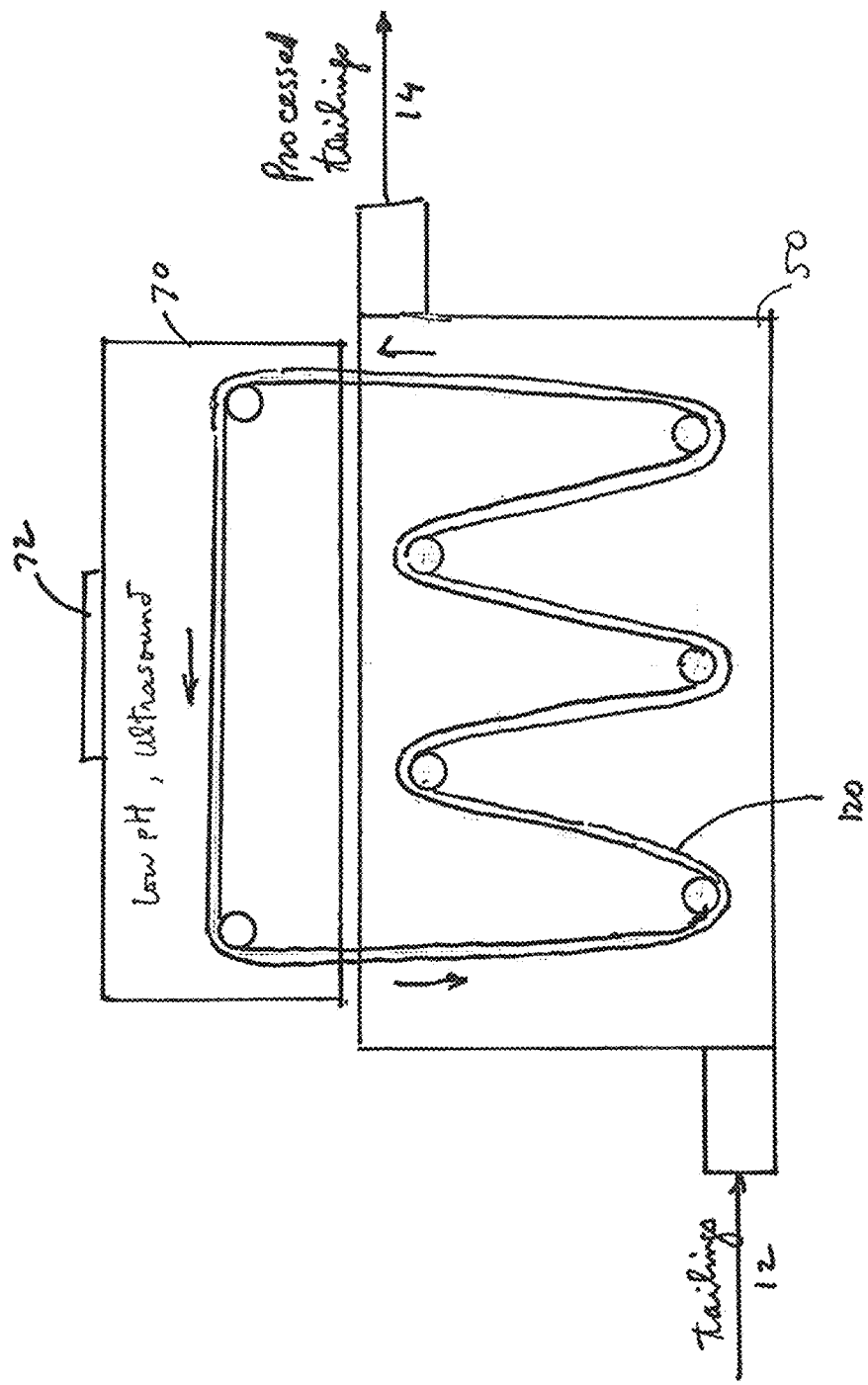

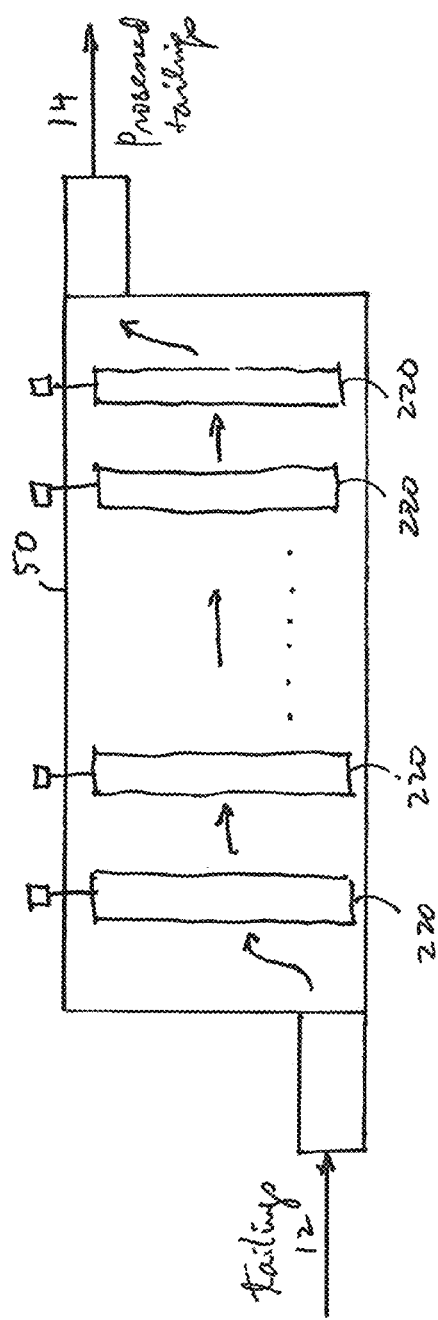
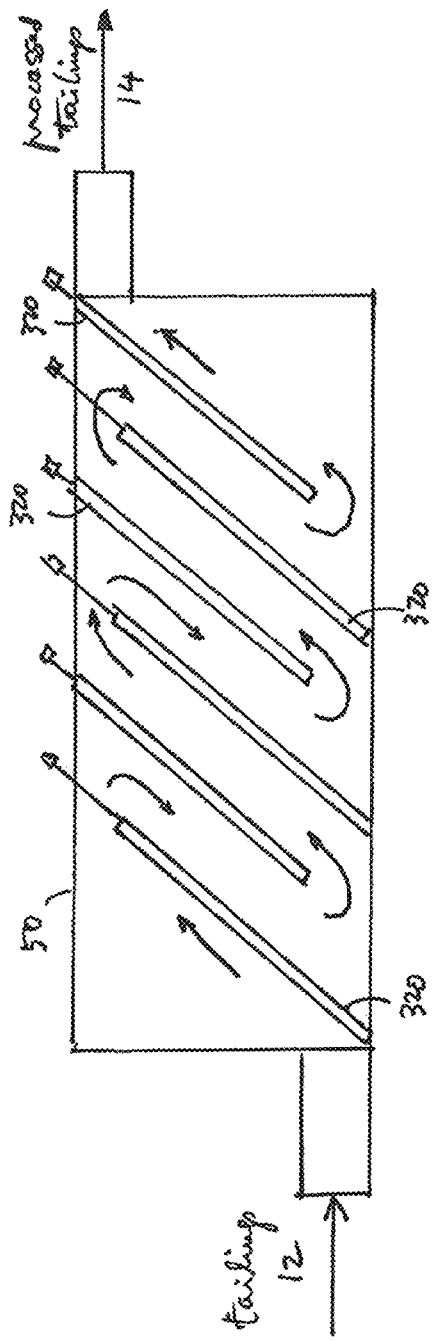
FIG. 3b
FIG. 3c

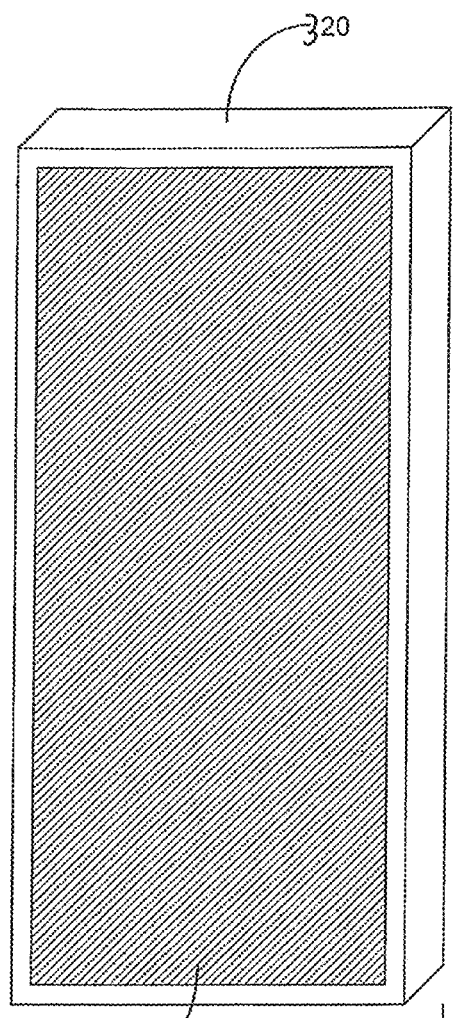
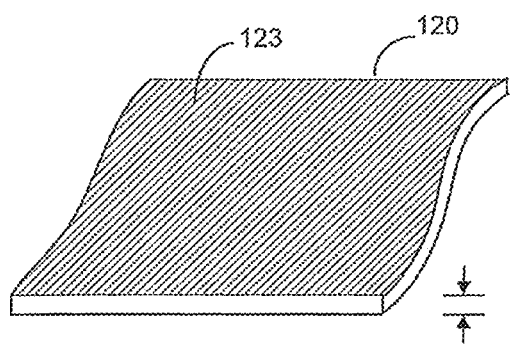
FIG. 5a
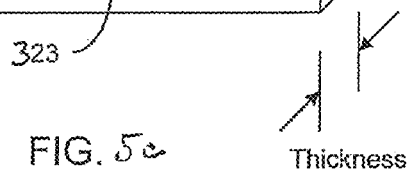
FIG. 5c
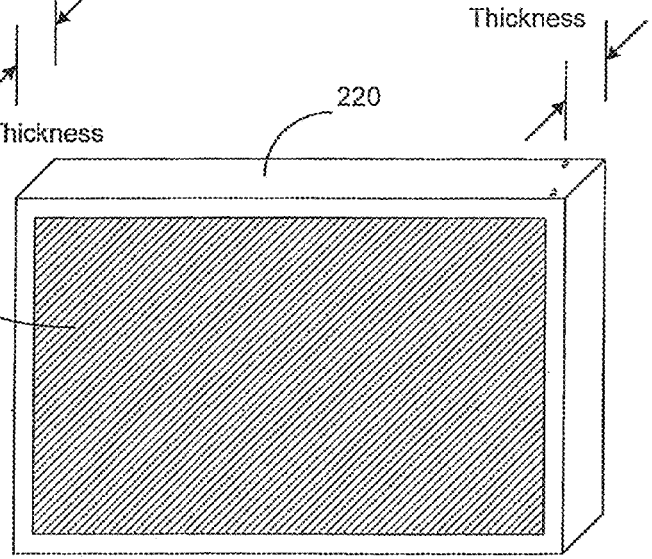
FIG. 5b

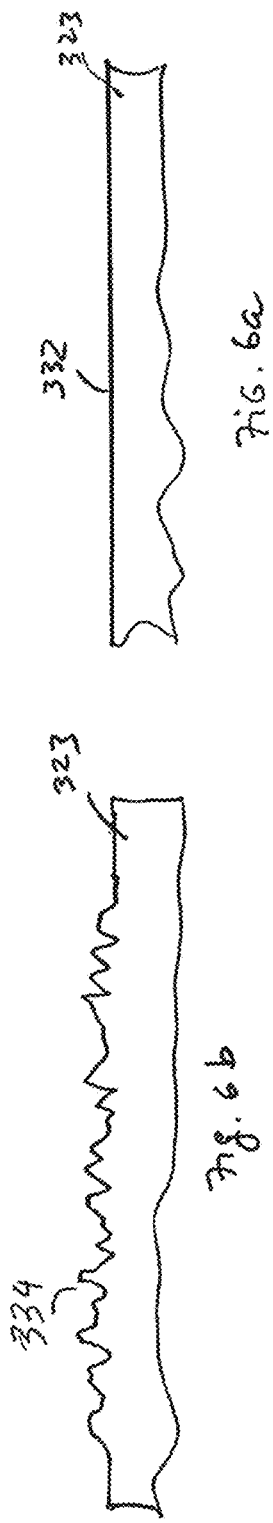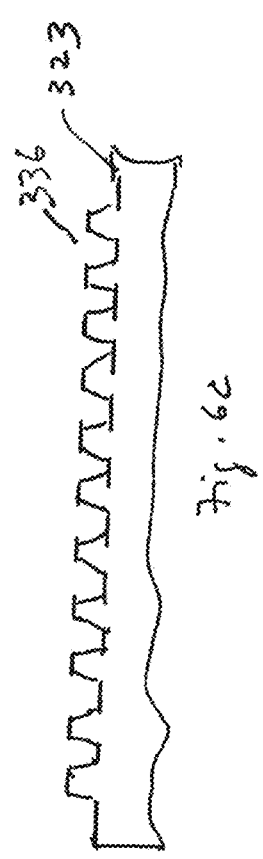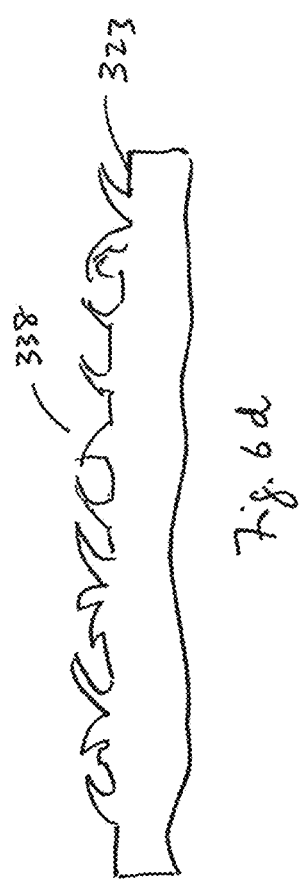

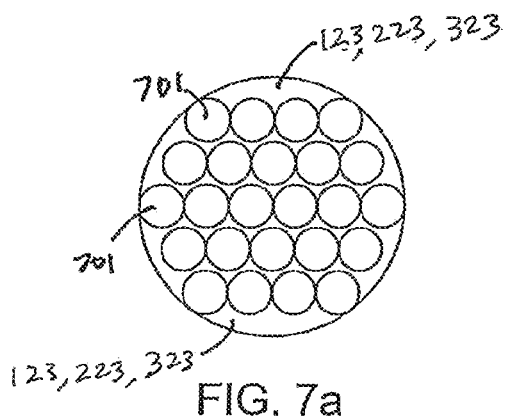
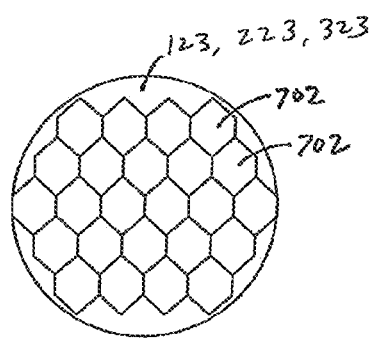
FIG. 7a          FIG. 7b
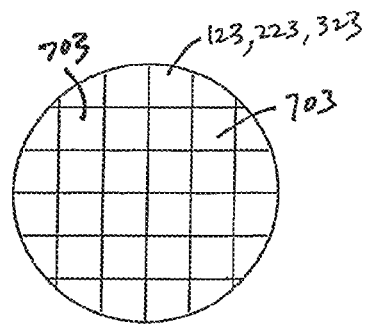
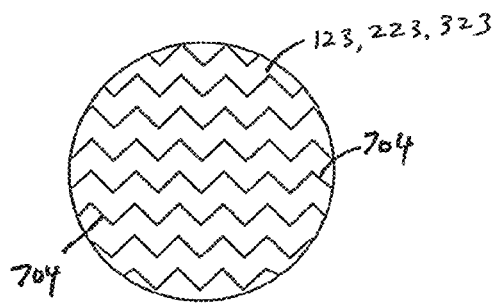
FIG. 7c          FIG. 7d
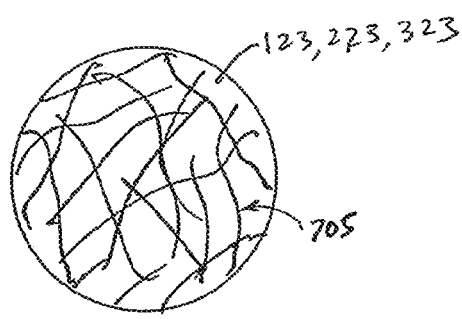
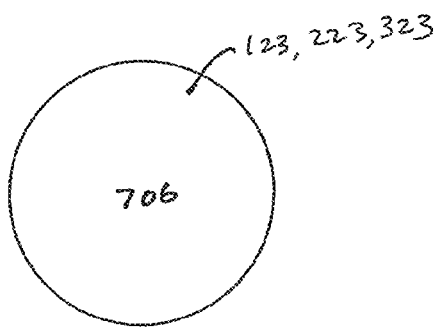
FIG. 7e          FIG. 7f

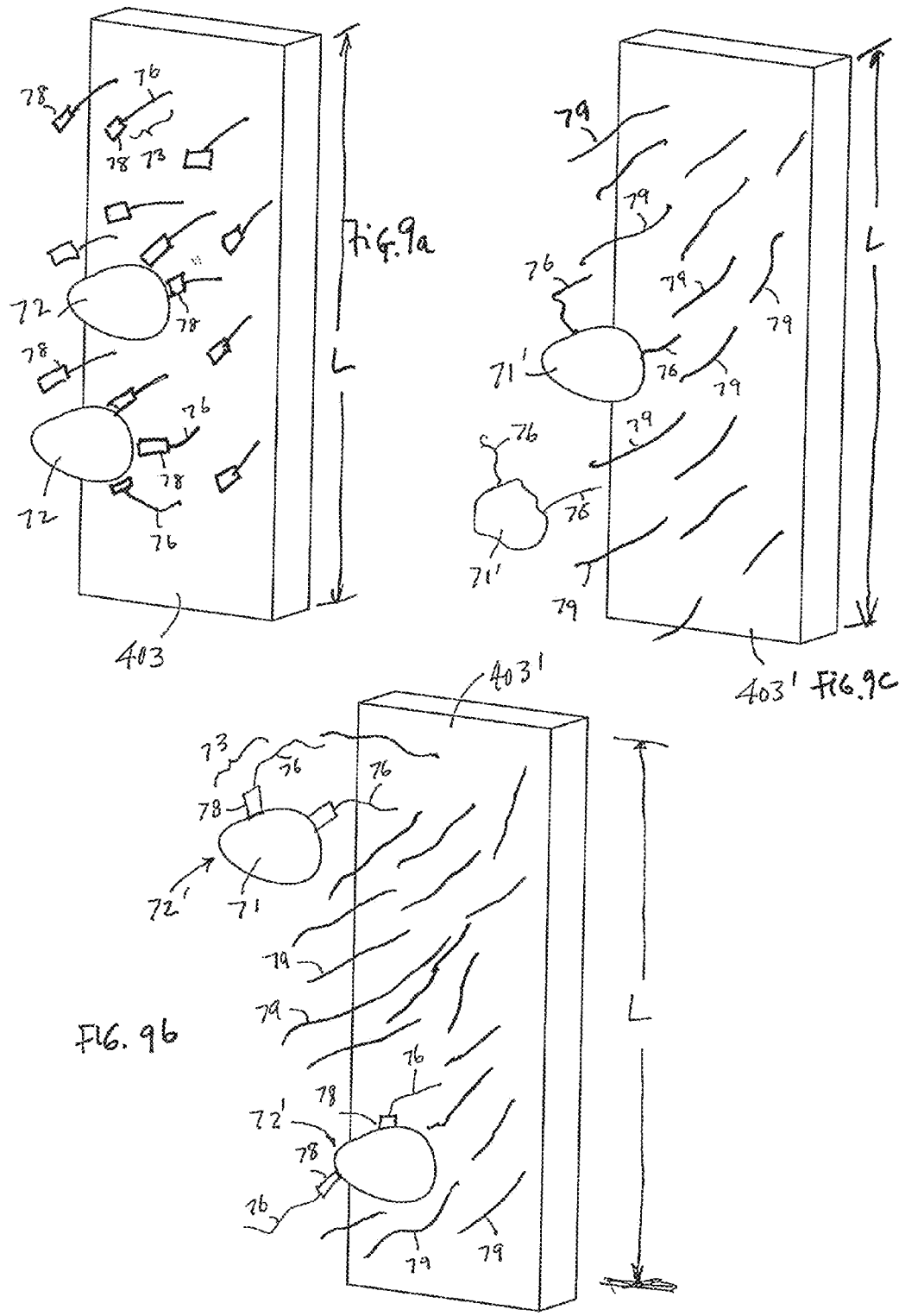

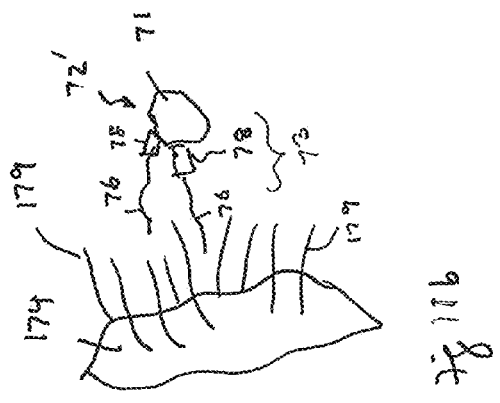
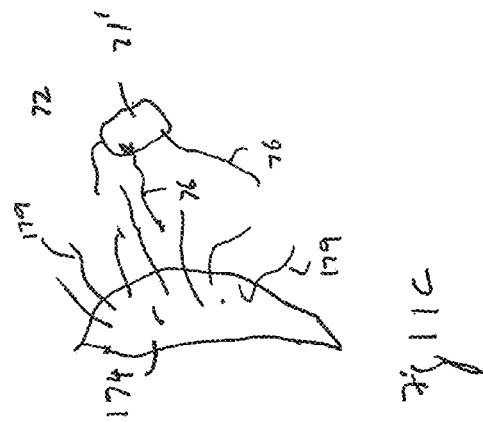
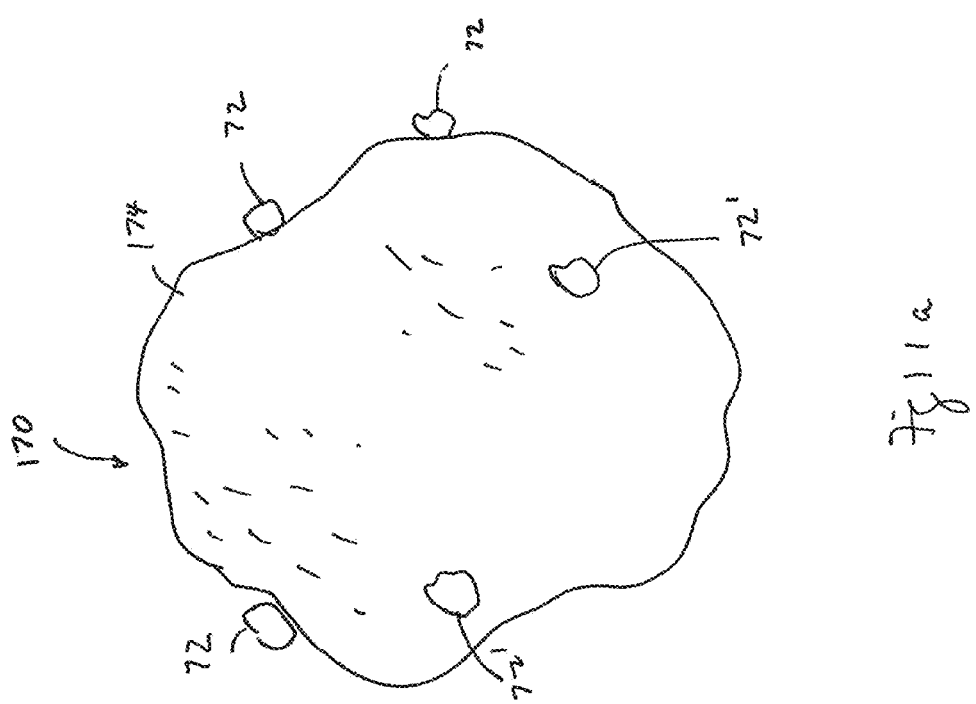

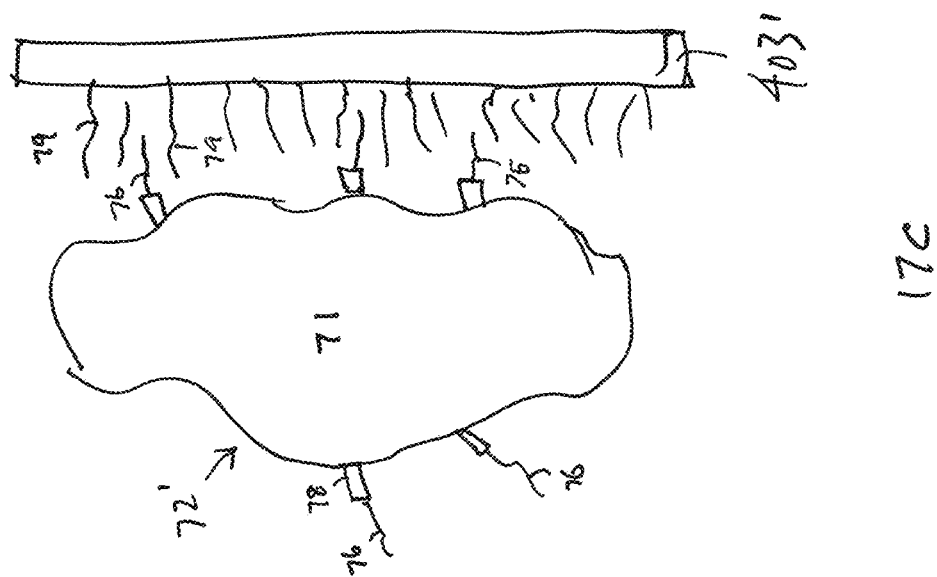

MINERAL RECOVERY IN TAILINGS USING FUNCTIONALIZED POLYMERS

CROSS-REFERENCE TO RELATED PATENT APPLICATIONS

The present application claims the benefit of U.S. Provisional Patent Application No. 61/489,893, filed 25 May 2011, and U.S. Provisional Patent Application No. 61/533,544, filed 12 Sep. 2011, which are both incorporated by reference herein in their entirety.

This application is also related to the following eight PCT applications, which are all concurrently filed on 25 May 2012, which all claim the benefit of the aforementioned U.S. Provisional Patent Application No. 61/489,893, filed 25 May 2011, and the aforementioned U.S. Provisional Patent Application No. 61/533,544, filed 12 Sep. 2011, and which are all incorporated by reference in their entirety so as to include the subject matter of each other, as follows:

PCT application no. PCT/US12/39528, entitled "Flotation separation using lightweight synthetic bubbles and beads;"

PCT application no. PCT/US12/39534, entitled "Mineral separation using functionalized membranes;"

PCT application no. PCT/US12/39540, entitled "Mineral separation using sized, weighted and magnetized beads;"

PCT application no. PCT/US12/39576, entitled "Synthetic bubbles/beads functionalized with molecules for attracting or attaching to mineral particles of interest;"

PCT application no. PCT/US12/39591, entitled "Method and system for releasing mineral from synthetic bubbles and beads;"

PCT application no. PCT/US/39596, entitled "Synthetic bubbles and beads having hydrophobic surface;"

PCT application no. PCT/US/39631, entitled "Mineral separation using functionalized filters and membranes;" and PCT application no. PCT/US12/39658, entitled "Techniques for transporting synthetic beads or bubbles In a flotation cell or column."

BACKGROUND OF THE INVENTION

1. Technical Field

This invention relates generally to a method and apparatus for separating valuable material from unwanted material in a mixture, such tailings of a flotation process.

2. Description of Related Art

In many industrial processes, flotation is used to separate valuable or desired material from unwanted material. By way of example, in this process a mixture of water, valuable material, unwanted material, chemicals and air is placed into a flotation cell. The chemicals are used to make the desired material hydrophobic and the air is used to carry the material to the surface of the flotation cell. When the hydrophobic material and the air bubbles collide they become attached to each other. The bubble rises to the surface carrying the desired material with it.

The performance of the flotation cell is dependent on the bubble surface area flux in the collection zone of the cell. The bubble surface area flux is dependent on the size of the bubbles and the air injection rate. Controlling the bubble surface area flux has traditionally been very difficult. This is a multivariable control problem and there are no dependable real time feedback mechanisms to use for control.

Froth flotation is a process for selectively separating hydrophobic materials from hydrophilic. The process has been adapted and applied to a wide variety of materials to be separated, and additional collector agents, including surfactants and synthetic compounds have been adopted for various applications. The flotation process is used for the separation of a large range of sulfides, carbonates and oxides prior to further refinement. Phosphates and coal are also upgraded (purified) by flotation technology. Froth flotation commences by comminution (that is, crushing and grinding), which is used to increase the surface area of the ore for subsequent processing. The ore include the desired minerals and other unwanted materials, know a gangue. The process of grinding the ore into a fine power is known as liberation. The fine powder ore is then mixed with water to form pulp slurry. The desired mineral is rendered hydrophobic by the addition of a surfactant or collector chemical. The particular chemical depends on which mineral is being refined. This slurry (more properly called the pulp) of hydrophobic mineral particles and hydrophilic gangue particles is then placed in a flotation column or horizontal pipeline wherein the concentrated mineral is separated from the tailings containing the gangue. To be effective on a given ore slurry, the collectors are chosen based upon their selective wetting of the types of particles to be separated. A good collector will adsorb, physically or chemically, with one of the types of particles. In a flotation circuit for mineral concentration, various flotation reagents are added to a mixture of ore and water (called pulp) in a conditioning tank. The flow rate and tank size are designed to give the minerals enough time to be activated. The conditioner pulp is fed to a bank of rougher cells which remove most of the desired minerals as a concentrate. The rougher pulp passes to a bank of scavenger cells where additional reagents may be added. The scavenger cell froth is usually returned to the rougher cells for additional treatment, but in some cases may be sent to special cleaner cells. The scavenger pulp is usually barren enough to be discarded as tails. More complex flotation circuits have several sets of cleaner and re-cleaner cells, and intermediate re-grinding of pulp or concentrate. A typical slurry processing system is depicted in FIG. 1. As shown in FIG. 1, pulp slurry 8 is processed through a plurality of flotation cells 10 and the tailings 12 are discarded in a tailings pond or dam 100. If the processed slurry 9 can be further processed for mineral recovery, another flotation cell 10 may be used to repeat the process. When the processed slurry 9 is processed in the last flotation cell 10, froth flotation is generally no longer an effective or viable process for mineral collection. Because of a number of other factors, as much as 15% of the liberated minerals are not recovered and are discarded as gangue in the pond or dam 100.

There is a need in the industry to provide a better way to separate valuable material from unwanted material, from the discarded tailings.

SUMMARY OF THE INVENTION

The Method

According to some embodiments, the present invention may take the form of a method comprising steps for providing collection apparatus functionalized with a synthetic material comprising a plurality of molecules having a functional group configured to collect mineral particles of interest to the surface of the collection apparatus; and causing the collection apparatus to contact with tailings having the mineral particles of interest, e.g., including the tailings from a flotation process.

According to some embodiments of the present invention, the functional group may include an ion or charge species for bonding the mineral particles of interest to the molecules.

The functional group may include, but not limited to, one or more ions in carboxylic, sulfates, sulfonates, xanthates, dithiophosphates, thionocarboamates, thioureas, xanthogens, monothiophosphates, hydroquinones and polyamines. The synthetic material may be selected from a group consisting of polyamides, polyesters, polyurethanes, phenol-formaldehyde, urea-formaldehyde, melamine-formaldehyde, polyacetal, polyethylene, polyisobutylene, polyacrylonitrile, poly(vinyl chloride), polystyrene, poly(methyl methacrylates), poly(vinyl acetate), poly(vinylidene chloride), polyisoprene, polybutadiene, polyacrylates, poly(carbonate), phenolic resin, and polydimethylsiloxane. The list is not necessarily exhaustive.

According to some embodiments of the present invention, the functional group may be configured to render the surface of the collection apparatus hydrophobic. By way of example, the synthetic material may be selected from a group consisting of polystyrene, poly(d,l-lactide), poly(dimethylsiloxane), polypropylene, polyacrylic, polyethylene, hydrophobically-modified ethyl hydroxyethyl cellulose polysiloxanates, alkylsilane and fluoroalkylsilane. The list is not necessarily exhaustive. The mineral particles of interest may have one or more hydrophobic molecular segments attached thereon. The method may also further comprise providing collector molecules in the tailings, each collector molecule comprising a first end and a second end, the first end comprising the functional group configured to attach to the mineral particles of interest, the second end comprising a hydrophobic molecular segment, including where the collector molecules is xanthates. The synthetic material may include a siloxane derivative, or polysiloxanates, or hydroxyl-terminated polydimethylsiloxanes.

According to some embodiments of the present invention, the method may include discharging the tailings to a discharge area, and causing the collection apparatus to contact with the tailings before or after the tailings are discharged.

According to some embodiments of the present invention, the collection apparatus may comprise a plurality of passage ways in the collection area, wherein the passage ways comprise collection surfaces configured with the synthetic material, and the method may further include causing at least part of the tailings to move through the passage ways so as to allow the mineral particles of interest to contact with the molecules on the collection surfaces in the passage ways. By way of example, the passage ways may include a plurality of fibers for providing the collection surfaces.

According to some embodiments of the present invention, the collection apparatus may include a collection plate having a collection surface configured with the synthetic material, and the method may further include causing at least part of the tailings to move over the collection plate so as to allow the mineral particles of interest to contact with the molecules on the collection surface.

According to some embodiments of the present invention, the collection apparatus may include a plurality of solid-phase bodies for providing collection surfaces configured with the synthetic material.

According to some embodiments of the present invention, the collection apparatus may be configured to contact the tailings over a period of time for providing an enriched collection surface containing the mineral particles, and the method may further include separating the collection apparatus from the tailings; and releasing the mineral particles of interest from the enriched collection surface. By way of example, the step for releasing may include contacting the enriched collection surface with a liquid having a pH value ranging from 0 to 7, or at least partially submerging the enriched collection surface in a liquid and applying ultrasound waves in the liquid for providing ultrasonic agitation over the enriched collection surface.

The System

According to some embodiments, the present invention may take the form of a system featuring a collection processor configured to receive tailings of a flotation process, the tailings having mineral particles of interest; and at least one collection apparatus located in the collection processor, the collection apparatus comprising a collection surface configured with a functionalized polymer comprising a plurality of molecules having a functional group configured to attract the mineral particles of interest to the collection surface.

According to some embodiments of the present invention, the functional group may include an ionizing bond for bonding the mineral particles of interest to the molecules. By way of example, the synthetic material may be selected from a group consisting of polyamides, polyesters, polyurethanes, phenol-formaldehyde, urea-formaldehyde, melamine-formaldehyde, polyacetal, polyethylene, polyisobutylene, polyacrylonitrile, poly(vinyl chloride), polystyrene, poly(methyl methacrylates), poly(vinyl acetate), poly(vinylidene chloride), polyisoprene, polybutadiene, polyacrylates, poly(carbonate), phenolic resin, and polydimethylsiloxane.

According to some embodiments of the present invention, the functional group may be configured to render the collection area hydrophobic. By way of example, the synthetic material may be selected from a group consisting of polystyrene, poly(d,l-lactide), poly(dimethylsiloxane), polypropylene, polyacrylic, polyethylene, hydrophobically-modified ethyl hydroxyethyl cellulose polysiloxanates, alkylsilane and fluoroalkylsilane. Moreover, the mineral particles of interest may have one or more hydrophobic molecular segments attached thereon, and the tailings have a plurality of molecules, each collector molecule comprising a first end and a second end, the first end comprising the functional group configured to attach to the mineral particles of interest, the second end comprising a hydrophobic molecular segment. The synthetic material may include a siloxane derivative, or polysiloxanates, or hydroxyl-terminated polydimethylsiloxanes.

According to some embodiments of the present invention, the collection surface may be configured to contact the tailings over a period of time for providing an enriched collection surface in the collection apparatus, containing the mineral particles of interest, and the system may further include a release processor configured to receive the collection apparatus having the enriched collection surface, the release processor further configured to provide a release medium for releasing the mineral particles of interest from the enriched collection surface. By way of example, the release medium may include a liquid configured to contact with the enriched collection surface, the liquid having a pH value ranging from 0 to 7. The release medium may also include a liquid configured to contact with the enriched collection surface, and the system may further include an ultrasound source configured to apply ultrasound waves to the enriched collection area for releasing the mineral particles of interest from the enriched collection surface.

Embodiment Based at Least Partly on Functionalized Polymers

According to some embodiments of the present invention, the present invention may provide mineral separation techniques using functionalized polymers. For example, the present invention may take the form of a new machine and process for recovering valuable materials or minerals from the tailings using such functionalized polymers. In particular, various functionalized polymers may be used to attract the valuable materials or mineral particles of interest in the tailings, consistent with that set forth herein. The tailings may be put into contact with a functionalized polymer surface which has been engineered to attract the mineral of interest. The functionalized polymer surface may include, e.g., a synthetic bubble or bead, consistent with that set forth in patent application Ser. No. 14/116,438, filed Feb. 3, 2014, claiming benefit to the aforementioned U.S. Provisional Patent Application No. 61/489,893, as well as membrane or membrane structure that may take the form of an impeller, a conveyor belt, a filter assembly, or a flat plate, consistent with that set forth in the aforementioned U.S. Provisional Patent Application No. 61/533,544.

The unwanted material may be washed away and only the desirable material or mineral is left on the functionalized polymer surface, or the membrane structure containing the functionalized polymer surface may be separated from the unwanted material. Such separation can take place via techniques related to flotation, size separation, gravimetric separation, and/or magnetic separation. The enriched surface is then treated so that the mineral is released and collected. The functionalized polymer surface can then be reused.

According to some embodiments of the present invention, the functionalized polymer surface may be provided on a functionalized polymer coated member. The functionalized polymer coated member may take the form of a functionalized polymer coated conveyor belt configured to run between a recovery processor and a release processor. The functionalized polymer coated conveyor belt may be made of a mesh material. In the recovery processor, the functionalized coated conveyor belt is configured to increase the contact between the tailings and the functionalized polymer.

The functionalized polymer coated member may take the form of a functionalized polymer coated collection filter configured to be placed in a recovery processor or to move in a recovery processor to increase the contact between the tailings and the functionalized polymer. The functionalized polymer coated member may take the form of a membrane or a thin soft pliable sheet or layer.

The functionalized polymer coated member may take the form of a functionalized polymer coated collection plate configured to be placed in a recovery processor or to move in a recovery processor to increase the contact between the tailings and the functionalized polymer. The functionalized polymer coated member may take the form of a pliable sheet or a rigid plate.

The functionalized polymer coated member may take the form of a functionalized polymer coated impeller blade configured to be placed in a recovery processor or to move between a recovery zone and a release zone.

Combined Collector/Hydrophobic Beads/Bubbles

According to some embodiments of the present invention, a part of the surface of the synthetic bubbles or beads may be configured to have the molecules attached thereto, wherein the molecules comprise collectors.

According to some embodiments of the present invention, a part of the surface of the synthetic bubbles or beads may be configured to have the molecules attached thereto, wherein the molecules comprise collectors, and another part of the surface of the synthetic bubbles or beads may be configured to be hydrophobic.

According to some embodiments of the present invention, a part of the surface of the synthetic bubbles or beads may be configured to be hydrophobic.

BRIEF DESCRIPTION OF THE DRAWING

Referring now to the drawing, which are not necessarily drawn to scale, the foregoing and other features and advantages of the present invention will be more fully understood from the following detailed description of illustrative embodiments, taken in conjunction with the accompanying drawing in which like elements are numbered alike:

FIG. 1 is a diagram of a prior art slurry processing system.

FIGS. 2a-2d are diagrams of an overall scheme for tailings processing, according to some embodiments of the present invention.

FIG. 3a is a diagram of a recovery processor configured with a functionalized polymer coated conveyor belt operated in conjunction with a releasing processor, according to some embodiments of the present invention.

FIG. 3b is a diagram of a recovery processor configured with a plurality of filters having functionalized polymer surfaces for collecting valuable material in a batch process, according to some embodiments of the present invention.

FIG. 3c is a diagram of a recovery processor configured with a plurality of collection plates having functionalized polymer surfaces for collecting valuable material in a batch process, according to some embodiments of the present invention.

FIG. 5a is an illustration of a section of a conveyor belt, according to some embodiments of the present invention.

FIG. 5b is an illustration of a filter, according to some embodiments of the present invention.

FIG. 5c is an illustration of a collection plate, according to some embodiments of the present invention.

FIGS. 6a-6d illustrate various surface features of the collection plate, according to some embodiments of the present invention.

FIGS. 7a-7f illustrate various surface features of the filter and the conveyor belt, according to some embodiments of the present invention.

FIG. 9a illustrates a plurality of functional groups attached to edges or surfaces for attracting mineral particles, according to some embodiments of the present invention.

FIG. 9b illustrates a plurality of hydrophobic molecules attached to edges or surfaces for attracting mineral particles, according to some embodiments of the present invention.

FIG. 9c illustrates a plurality of hydrophobic molecules attached to edges or surfaces for attracting non-mineral particles, according to some embodiments of the present invention.

FIG. 11a illustrates a synthetic bead functionalized to attract hydrophobic particles, according to some embodiments of the present invention.

FIG. 11b is an enlarged surface portion of the synthetic bead functionalized to attract wetted mineral particles, according to some embodiments of the present invention.

FIG. 11c is an enlarged surface portion of the synthetic bead functionalized to attract non-mineral hydrophobic particles, according to some embodiments of the present invention.

FIG. 14a is a side partial cutaway view in diagram form of a separation processor configured with two chambers, tanks or columns having a functionalized polymer coated impeller arranged therein according to some embodiments of the present invention, and includes FIG. 14b is a top partial cross-sectional view in diagram form of a functionalized polymer coated impeller moving in an attachment rich environment contained in an attachment chamber, tank or column and also moving in a release rich environment contained in a release chamber, tank or column according to some embodiments of the present invention.

FIG. 17c shows a large, wetted mineral particle is attracted to a plurality of hydrophobic molecules on a surface of a filter, according to some embodiments of the present invention.

DETAILED DESCRIPTION OF THE INVENTION

FIG. 2a-2d: Tailings Processing

Figure 4:
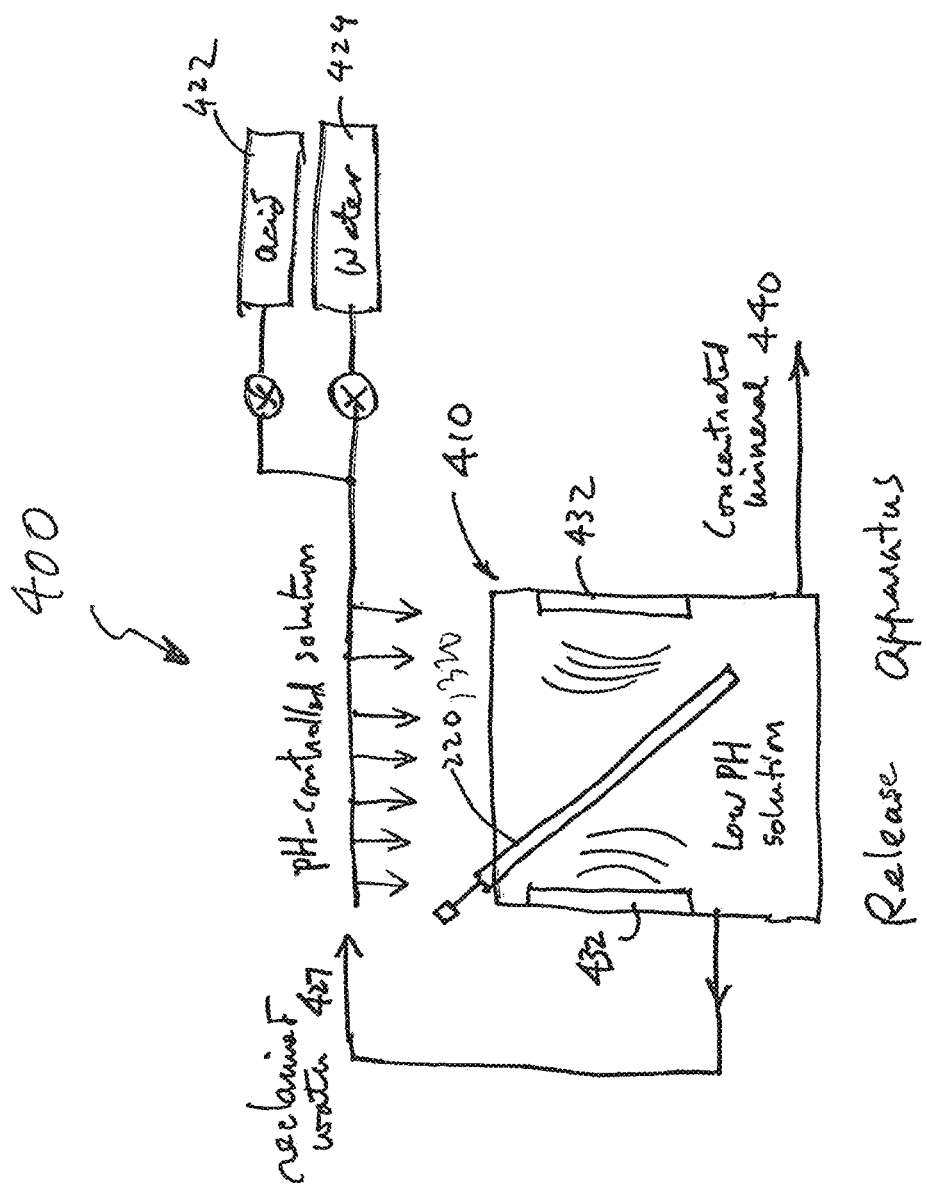
FIG. 4 is a diagram of a releasing processor, according to some embodiments of the present invention.

By way of example, tailings from a flotation process can be processed in a tailings pond or in a location between the end of the flotation process and the tailings pond. According to some embodiments of the present invention, a method or technique is provided to recover a valuable material or mineral particle of interest in, or that form part of, the tailings, using collection apparatus that may be functionalized with a synthetic material comprising a plurality of molecules having a functional group configured to attract the mineral particles of interest to the surface of the collection apparatus. The method or technique includes causing the collection apparatus to contact with the tailings having the mineral particles of interest, including the tailings from a flotation process. Numerous techniques or ways are set forth herein for causing the collection apparatus to contact with the tailings.

According to some embodiments of the present invention, the functional group may include an ionizing bond for bonding the mineral particles to the molecules. According to some embodiments of the present invention, the functional group may render the collection area or surface hydrophobic in order to attract hydrophobic mineral particles of interest. In the specification, the terms "functionalized synthetic material", "synthetic material" and "functionalized polymer" are used interchangeably. The terms "valuable material", "valuable mineral" and "mineral particles of interest" are also used interchangeably. The term "polymer" means a large molecule made of many units of the same or similar structure linked together.

In the embodiment as shown in FIG. 2a, after the tailings 12 is discharged from a last flotation cell 10 to a tailings pond or dam 100, a functionalized polymer 20 may be placed in the tailings pond to collect the valuable material of interest in the pond.

In the embodiment as shown in FIG. 2b, a functionalized polymer 30 may be used in a recovery processor 50 located closed to the last flotation cell 10 to process the tailings 12 in order to collect the valuable material of interest in the recovery processor 50. The processed tailings 14 are then transported to the pond or dam 100.

In the embodiment as shown in FIG. 2c, the recovery processor 50 may be placed near the pond 100. The recovery processor 50 may use the functionalized polymer 30 to process the tailings 12. The processed tailings 14 may then be discharged into the pond or dam 100.

In the embodiment as shown in FIG. 2d, the functionalized polymer 30 may be used to collect the mineral particle of interest in the recovery processor 50 and the functionalized polymer 20 may be used in the pond 100.

By way of example, the functionalized polymer 20, 30 may comprise functionalized polymer coated collection areas or surfaces as shown in FIGS. 3a-3c, 5a-5c, 6a-6d, 7a-7f, 8a-9c, 11a, 12a.

FIGS. 3a-3c: Functionalized Polymer in Recovery Processor

By way of example, the functionalized polymer 30 (FIGS. 2c-2d), according to some embodiments, may be provided on a collection apparatus in the recovery processor. The collection apparatus may include a collection area or surface coated with the functionalized polymer. The collection apparatus can take many different forms, and the scope of the invention is not intended to be limited to any particular type or kind thereof; either now known or later developed in the future. For example, the collection apparatus can take the form of a conveyor belt, a filter and a collection plate.

In the embodiment as shown in FIG. 3a, one or both sides of the conveyor belt 120 may be coated with, or made of, the functionalized polymer. As tailings 12 may be received into the recovery processor 50, the tailings are caused to contact with the surfaces of the conveyor belt 120, which is moving in a continuous loop between the recovery processor 50 and a release processor 70. The valuable material or mineral particle of interest attached to the surfaces of the conveyor belt 120 in the recovery processor 50 will be released from the conveyor belt in the release processor 70 by means of a low pH environment and/or by means of ultrasonic agitation. As shown in FIG. 3a, one or more ultrasound sources 72 may be provided in the release processor 70 in order to apply ultrasonic agitation to the surfaces of the conveyor belt. The pH value in the release processor can be ranged from 0 to 7. After being processed in the recovery processor 50, the processed tailings 14 can be transported to a tailings pond or directly discharged into a tailings pond. Alternatively, the processed tailings 14 can be received into another recovery processor 50 for further processing.

In the embodiment as shown in FIG. 3b, a plurality of filters 220 may be used in a group. Each of the filters 220 may have a plurality of passage ways (see FIGS. 7a-7e) to allow the tailings 12 to move through. The passage ways may be used to provide collection areas or surfaces (see FIGS. 8a-9c) configured to contact with the tailings as the tailings pass through the passage ways. The collection areas or surfaces in the passage ways may be coated with, or made of, the functionalized polymer. As the tailings move from one end of the recovery processor 50 to the other end through the filters 220, the molecules of the functionalized polymer are configured to attract the mineral particles of interest in the tailings. When the filters 220 have collected a certain amount of mineral particles of interest, one or some of the filters 220 can be removed from the recovery processor 50 at a time in order to release the mineral particles collected on the filters.

In the embodiment as shown in FIG. 3c, a plurality of collection plates 320 may be arranged in a certain pattern to increase the contact between the tailings in the recovery processor 50 and the collection plates 320. Each of the collection plate 320 may be coated with, or made of, the functionalized polymer. As the tailings move from one end of the recovery processor 50 to the other end through the collection plates 320, the molecules of the functionalized polymer are configured to attract the mineral particles of interest in the tailings. When the collection plates 320 have collected a certain amount of mineral particles of interest, one or some of the collection plates 320 can be removed from the recovery processor 50 at a time in order to release the mineral particles collected on the collection plate. The mineral particles attached to the filters 220 or the collection plates 320 can be released in many different ways. For example, they can be released in a low pH environment, by ultrasonic agitation, by microwaves, by ultraviolet light illumination or thermally. By way of example, a filter 220 or collection plate 320 with collected mineral particles can be taken to a release station 400 as shown in FIG. 4. The filter 200 or collection plate may be placed in a release apparatus 410 to be washed with a mixture of acid and water provided by water container 424 and acid container 422. One or more ultrasonic sources 432 may be used to shake loose the attached mineral particles from the filter 220 or collection plate 230. The reclaimed water 427 can be channeled back for reuse. The concentrated mineral 440 can be taken out of the releasing apparatus 410.

FIGS. 5a, 5b and 5c: Conveyor Belts, Filters and Collection Plates

By way of example, the conveyor belt 120 (FIG. 3a) may be configured with a collection area 123 to support the functionalized polymer (FIG. 5a). The filter 220 (FIG. 3b) may be configured with a collection area 223 to support the functional polymer (FIG. 5b). The collection plate 320 (FIG. 3c) may be configured with a collection area 323 to support the functionalized polymer (FIG. 5c). The collection area 123, 223 and 323 can take many forms and have various surface features (FIGS. 7a-7f) to collect the mineral particles of interest, when the conveyor belt 120, the filter 220 and the collection plate 320 are made to contact with the tailings, whether in a tailings pond 100 (FIGS. 2a-2d) or in recovery processor 50 (FIGS. 2b-2d, 3a-3c).

FIGS. 6a-6d: Surface Structures

The collection area 323 of the collection plate 320 can take many different forms. For example, the collection area 323 on one or both of sides of the collection plate 323 can be a smooth surface, as shown in FIG. 6a. The collection area 323 on one or both of sides of the collection plate 323 can be a rough surface of irregular height and pattern, as shown in FIG. 6b. The collection area 323 on one or both of sides of the collection plate 323 can have grooves and dents, as shown in FIG. 6c. The collection area 323 on one or both of sides of the collection plate 323 can have hair-like structure as shown in FIG. 6d. The collection area may be coated with, or made of, functionalized polymer to attract mineral particles of interest. The surface structures on FIGS. 6b-6d may be configured to increase the contact between the functionalized polymer on the collection area and the tailings.

FIGS. 7a-7f: Surface Features

By way of example, each of the collection areas 123, 223 and 323 (FIGS. 5a-5c) may have a plurality of openings to allow the tailings 12 (FIGS. 3a-3c) to pass through while collecting at least part of the valuable material or mineral particles of interest in the tailings. The surface inside an opening and the surfaces or edges around the opening may be provided with the molecules of the functionalized polymer to attract the mineral particles. Those surfaces are referred to as collection surfaces. For example, the openings on the collection areas 123, 223 and 323 can take the form of holes or cylindrical passage ways 701 as shown in FIG.

7a. The openings on the collection areas 123, 223 and 323 can take the form of hexagonal passage ways 702 arranged like honeycomb, as shown in FIG. 7b. The collection areas 123, 223 and 323 can have a rectangular grid 703, as shown in FIG. 7c. The collection areas 123, 223 and 323 may comprise a stack of wavy sheets 704 a shown in FIG. 7d. The collection areas 123, 223 and 323 may comprise an irregular arrangement of fiber-like structures 705 as shown in FIG. 7e. The collection areas 123 and 323 may comprise a plain surface 706 as shown in FIG. 7f. The plain surface 706 may be a smooth surface, a paper-like surface or matted surface, without larger structures. The collection area 23, 123 and 223 can be made of a synthetic material, such as a polymer functionalized for attracting the mineral particles. Alternatively, only the collection surfaces may be coated with such a functionalized polymer while most part of the conveyor belt 120, the filter 220 and the collection plate 320 may be made of metal, ceramic, glass or a different polymer.

FIGS. 8a-9c: Surface Molecules

Figure 8C:
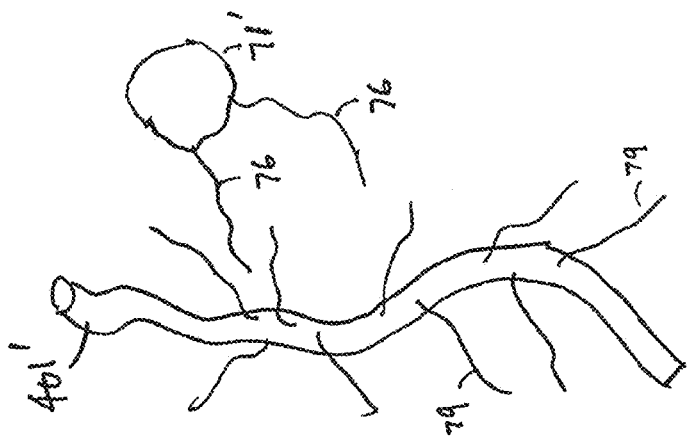
FIG. 8c illustrates a plurality of hydrophobic molecules attached to a fiber for attracting non-mineral particles, according to some embodiments of the present invention.
Figure 8B:
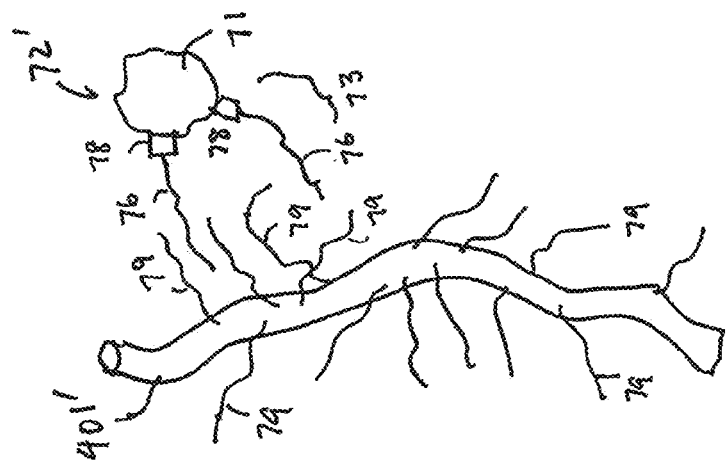
FIG. 8b illustrates a plurality of hydrophobic molecules attached to a fiber for attracting mineral particles, according to some embodiments of the present invention.
Figure 8A:
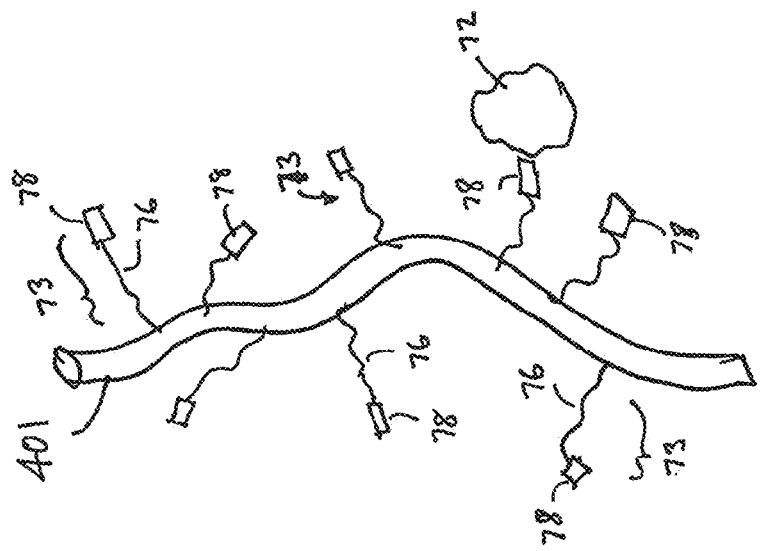
FIG. 8a illustrates a plurality of functional groups attached to a fiber for attracting mineral particles, according to some embodiments of the present invention.

By way of example, the fiber-like structures 705 (FIG. 7e) can be functionalized so that they become attached to molecules 73 (FIGS. 8a, 8b). The fiber-like structures 705 as shown in FIG. 7e can be made of individual fibers 401, 401' as shown in FIG. 8a-8c. In one embodiment of the present invention, the fiber 401 (FIG. 8a) can be made of a polymer that has a plurality of molecules 73 to provide the functional group 78 and the attaching molecular segment 76. A xanthate, for example, has both the functional group 78 and the molecular segment 76 to be incorporated into the polymer that is used to make the fiber 401. A functional group 78 is also known as a collector that is either ionic or non-ionic bonding to mineral particles 72. The ion can be anionic or cationic. An anion includes, but not limited to, oxyhydryl, such as carboxylic, sulfates and sulfonates, and sulfhydral, such as xanthates and dithiophosphates. Other molecules or compounds that can be used to provide the function group 78 include thionocarboamates, thioureas, xanthogens, monothiophosphates, hydroquinones and polyamines. In another embodiment of the present invention, the fiber 401 is coated with polymer that has the molecules 73 to provide the functional group 78 and the attaching molecular segment 76. With such a coating, the fiber 401 can be made of glass, ceramic, metal, nylon, cotton or a different polymer. A diagram of the fiber 401 and the attached molecules 73 is shown in FIG. 8a.

In a different embodiment of the present invention, the fiber 401' (FIG. 8b) can be made of a polymer that has a plurality of molecules 79 to render the fiber 401' (and thus the collection areas 123, 223 and 323 of FIGS. 5a-5c) hydrophobic. The polymer can be a hydrophobic material such as polystyrene, poly(d,l-lactide), poly(dimethylsiloxane), polypropylene, polyacrylic, polyethylene, etc. The polymer can also be a hydrophobically-modified polymer, such as hydrophobically-modified ethyl hydroxyethyl cellulose. Alternatively, the fiber 401' can be made of glass, ceramic, metal, nylon, cotton or other fabric materials and coated with hydrophobic molecules, such as polysiloxanates, alkylsilane and fluoroalkylsilane. The molecules 79 cause the fiber 401' to become hydrophobic. As such, a hydrophobically-modified mineral particle 72' can be attracted to the hydrophobic fiber 401'. The hydrophobically-modified, or wetted, mineral particle 72' may include a mineral particle 71 and one or more molecules 73 attached thereon. The molecule 73, or collector, may have a functional group 78 attached to the mineral particle 71 and a hydrophobic chain or molecular segment 76. A diagram showing the attraction between the hydrophobic chain or molecular segments 76 and the hydrophobic fiber 401' is shown in FIG. 8b. It should be understood that the particles 72' may be non-mineral and can be some harmful particles in a body of water. Furthermore, the hydrophobic fiber 401' can also be used to attract non-mineral particles. For example, if a non-mineral particle 71' has one or more hydrophobic chains or molecular segments 76, the non-mineral particle 71' may also attracted to the hydrophobic fiber 401'. A diagram showing the attraction between non-mineral particles 71' and the hydrophobic fiber 401' is shown in FIG. 8c. Thus, the hydrophobic fiber 401' can be used in a filter, impeller or conveyor belt (similar to those shown in FIGS. 4-6) for water-pollution control, water purification, etc.

The surfaces and edges around the openings or surface structures 701, 702, 703, 704 (FIGS. 7a-7d) can be functionalized to provide the molecules 73 (FIGS. 9a, 9b). The exposed surfaces and edges around the openings or surface structures 701, 702, 703, 704 are represented by surface portions 403, 403' as shown in FIGS. 9a-9c. The length L of the surface portions 403, 403' can be equal to the thickness of the conveyor belt 120, the filter 220 and the collection plate 320 (FIGS. 5a-5c). As with the fiber 401 as shown in FIG. 8a, the surface portion 403 can be made of a polymer that has a plurality of molecules 73 to provide the functional group 78 and the attaching molecular segment 76. In a different embodiment, the surface portion 403 may be coated with polymer that has the molecules 73 to provide the functional group 78 and the attaching molecular segment 76. The surface portion 403 can be made of glass, ceramic, metal, nylon, cotton or a different polymer. The functional group 78 may be used to attract mineral particles of interest 72. A diagram of the surface portion 403 and the attached molecules 73 is shown in FIG. 9a.

In a different embodiment of the present invention, the surface portion 403' can be made of a polymer having a plurality of molecules 79 that render the surface portion 403' (and thus the collection areas 123, 223 and 323 of FIGS. 5a-5c) hydrophobic. As with the hydrophobic fiber 401' as shown in FIGS. 8b and 8c, the polymer can be a hydrophobic material such as polystyrene, poly(d,l-lactide), poly (dimethylsiloxane), polypropylene, polyacrylic, polyethylene, etc. The polymer can also be a hydrophobically-modified polymer, such as hydrophobically-modified ethyl hydroxyethyl cellulose. Alternatively, the surface portion 403' can be made of glass, ceramic, metal, nylon, cotton or other fabric materials and coated with hydrophobic molecules, such as polysiloxanates, alkylsilane and fluoroalkylsilane. The molecules 79 cause the surface portion 403' to become hydrophobic. As such, a hydrophobically-modified mineral particle 72' is attracted to the hydrophobic surface portion 403'. A diagram showing the attraction between the molecular segments 76 and the hydrophobic surface portion 403' is shown in FIG. 9b. It should be understood that the particles 72' may be non-mineral and can be some harmful particles in a body of water. Furthermore, the hydrophobic surface portion 403' can also be used to attract non-mineral particles. For example, if a non-mineral particle 71' has one or more hydrophobic chains or molecular segments 76, the non-mineral particle 71' may also be attracted to the hydrophobic surface portion 403'. A diagram showing the attraction between the non-mineral particles 71' and the hydrophobic surface portion 403' is shown in FIG. 9c. Thus, a filter, collection plate or conveyor belt (similar to those shown in FIGS. 5a-5c) that has hydrophobic surface portions 403' can also be used for water-pollution control, water purification, etc. to rid of hydrophobically-modified particles 72' which may not be a mineral of interest, but some metal or other material or chemical harmful to the environment.

The treatment of plain surface 706 (FIG. 7f) can be made similar to the surface portions 403, 403' as shown in FIGS. 9a-9c. That is, the plain surface 706 can be functionalized to provide a functional group 78 as shown in FIG. 9a. The plain surface 706 can also be functionalized to be hydrophobic, as shown in FIGS. 9b and 9c.

It should be understood that, when the collection area or surface 123 of the conveyor belt 120 (FIG. 5a), the collection area or surface 223 of the filter 220 (FIG. 5b) and the collection area 323 of the collection plate 320 (FIG. 5c) are functionalized to be hydrophobic, the tailings 12 in the recovery processor 50 (FIG. 2b-2d, 3a-3c) and the tailings in the pond 100 (FIGS. 2a and 2d) must be mixed with collector molecules such as xanthates so that the mineral particles 71 (FIGS. 8b and 9b) in the tailings may be hydrophobically modified with the collector molecules 73 to become wetted mineral particles 72'.

Figure 10A:
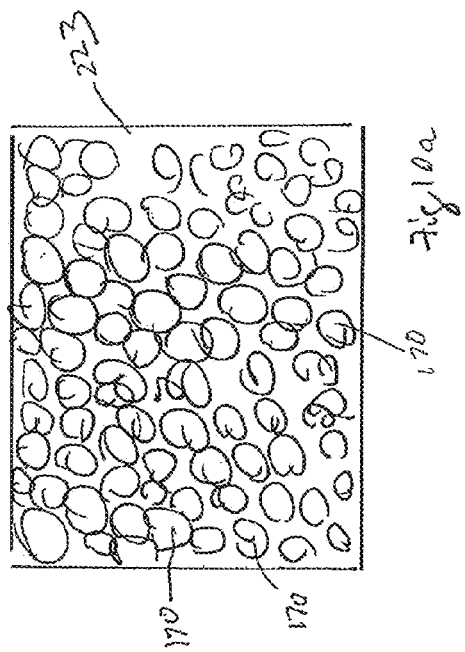
FIG. 10a illustrates a filter using a plurality of synthetic beads or bubbles for collecting valuable material in tailings of a flotation process, according to some embodiments of the present invention.
Figure 10C:
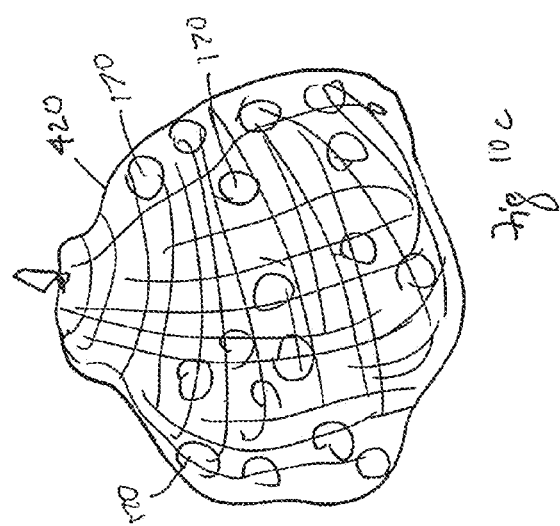
FIG. 10c illustrates a sack of synthetic beads which can be used as a filter to collect valuable material in tailings of a flotation process, according to some embodiments of the present invention.
Figure 10B:
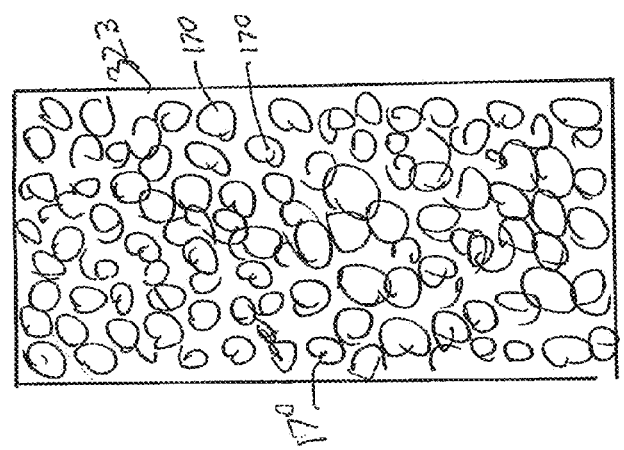
FIG. 10b illustrates a collection plate using a plurality of synthetic beads or bubbles for collecting valuable material in tailings of a flotation process, according to some embodiments of the present invention.

FIGS. 10a-10c: Different Embodiments

In different embodiments of the present invention, the functionalized synthetic material can be used to provide those particular molecules on beads or bubbles, or to make the beads or bubbles (see FIGS. 11a-12b). The bubbles or beads that have the particular molecules having a functional group configured to attract mineral particles of interest are herein referred to as synthetic bubbles or beads. By way of example, the synthetic beads or bubbles 170 may be used in a filter 220 to collect mineral particles 72, 72' (see FIGS. 8a-9b, 11a-12b). As shown in FIG. 10a, the filter may use a cage or the like to contain a plurality of synthetic beads to provide the collection surfaces in the collection area 223. As shown in FIG. 10b, the collection plate uses a cage or the like to contain a plurality of synthetic beads 170 to provide the collection surfaces in the collection area 323. When the synthetic beads or bubbles 170 are used to collect valuable material in a tailings pond 100 (FIG. 13), they can be put in a sack 420 as shown in FIG. 10c. As with the synthetic material that is used on the collection surfaces 403, 403' (FIGS. 9a-9c), the synthetic material to be used on the synthetic beads or bubbles 170 may have the functional groups 78 to attract the mineral particles 72, or may have the hydrophobic molecules 79.

FIG. 11a illustrates a synthetic bead functionalized to attract hydrophobic particles. As shown in FIG. 11a, the synthetic bubble or bead 170 has a solid-phase bead body to provide a bead surface 174. At least the outside part of the bead body is made of a synthetic material, such as a hydrophobic polymer, or a coating of a hydrophobic chemical. As shown in FIGS. 11a and 11b, the surface 174 of the synthetic bubble or bead comprises a plurality of molecules 79 which renders the surface 174 hydrophobic. For example, the surface 174 may be a glass surface coated with polysiloxanates which can bind to the hydroxyl group of the glass surface. Polysiloxanates, such as hydroxyl-terminated polydimethysiloxanes, have a silicon-oxygen chain to provide the hydrophobic molecules 79. The hydrophobic particle 72', as shown in FIG. 11b, can be a mineral particle 71 having one or more collectors 73 attached thereto. One end (78) of the collector 73 has an ionizing bond attached to the mineral particle 71. The other end of the collector 73 has a hydrophobic chain 76 which tends to move into the hydrophobic molecules 79. Thus, the hydrophobic particle 72' can be a wetted mineral particle. A collector, such as xanthate, has both the functional group 78 and the molecule 76. The hydrophobic particle 72, as shown in FIG. 11c, can be a particle 71' that has a hydrophobic chain 76. Such particle can be non-mineral related, but it can be arranged to contact with the hydrophobic synthetic bubbles or beads 170 of the present inventions. Likewise, the particle 71 may be non-mineral and can be harmful to the environment. Thus the hydrophobic bubbles or beads 170, according to the present invention, can be used in non-mining applications, such as water-pollution control. The size of the synthetic bead can be smaller than the minimum size of the mineral particles which is about 150 μm, and can be larger than the maximum size of the mineral particles. In certain applications, the size of the synthetic bead can be 1 cm or larger.

Figure 12B:
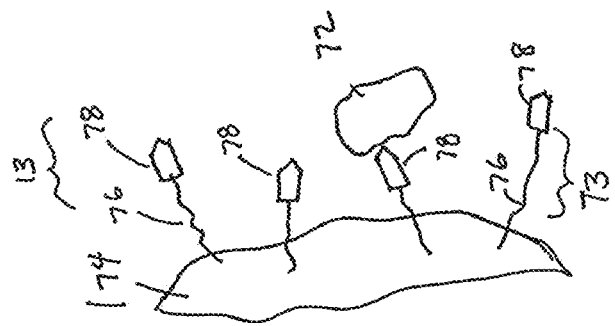
FIG. 12b is an enlarged surface portion of the synthetic bead functionalized to attract mineral particles, according to some embodiments of the present invention.
Figure 12A:
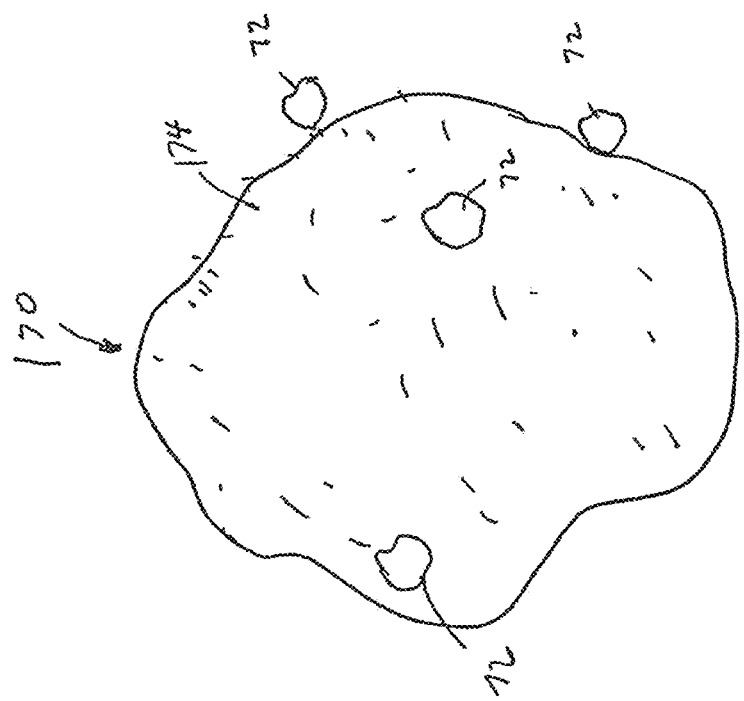
FIG. 12a illustrates a synthetic bead having a functional group to attract mineral particles, according to some embodiments of the present invention.

FIG. 12a illustrates a synthetic bead having a functional group to attract mineral particles of interest. The synthetic bead 170 has a bead body to provide a bead surface 174 to attract mineral particles of interest 72. FIG. 12b is an enlarged surface of the synthetic bead functionalized to attract mineral particles of interest. At least the outside part of the bead body may be made of a synthetic material, such as polymer, so as to provide a plurality of molecules or molecular segments 76 on the surface 174. The molecule 76 may be used to attach a chemical functional group 78 to the surface 174. In general, the molecule 76 can be a hydrocarbon chain, for example, and the functional group 78 can have an anionic bond for attracting a mineral, such as copper to the surface 174. A xanthate, for example, has both the functional group 78 and the molecular segment 76 to be incorporated into the polymer that is used to make the synthetic bead 70. The functional group 78 is also known as a collector that is either ionic or non-ionic for bonding to the mineral particles 72. Similarly, a chelating agent can be incorporated into or onto the polymer as a collector site for attracting a mineral, such as copper.

The releasing of the mineral particles from the synthetic beads can be similar to the releasing of the mineral particles from the collection plate, conveyor belt or the filter. For example, after the synthetic beads 170 in the collection area 223 or 323 or in the sack 320 (FIGS. 10a-10c) have collected a certain amount of mineral particles, the synthetic beads 170 can be made contact with a low pH solution and/or subjected to ultrasonic agitation (e.g., FIG. 4) in order to release the mineral particles.

Figure 13:
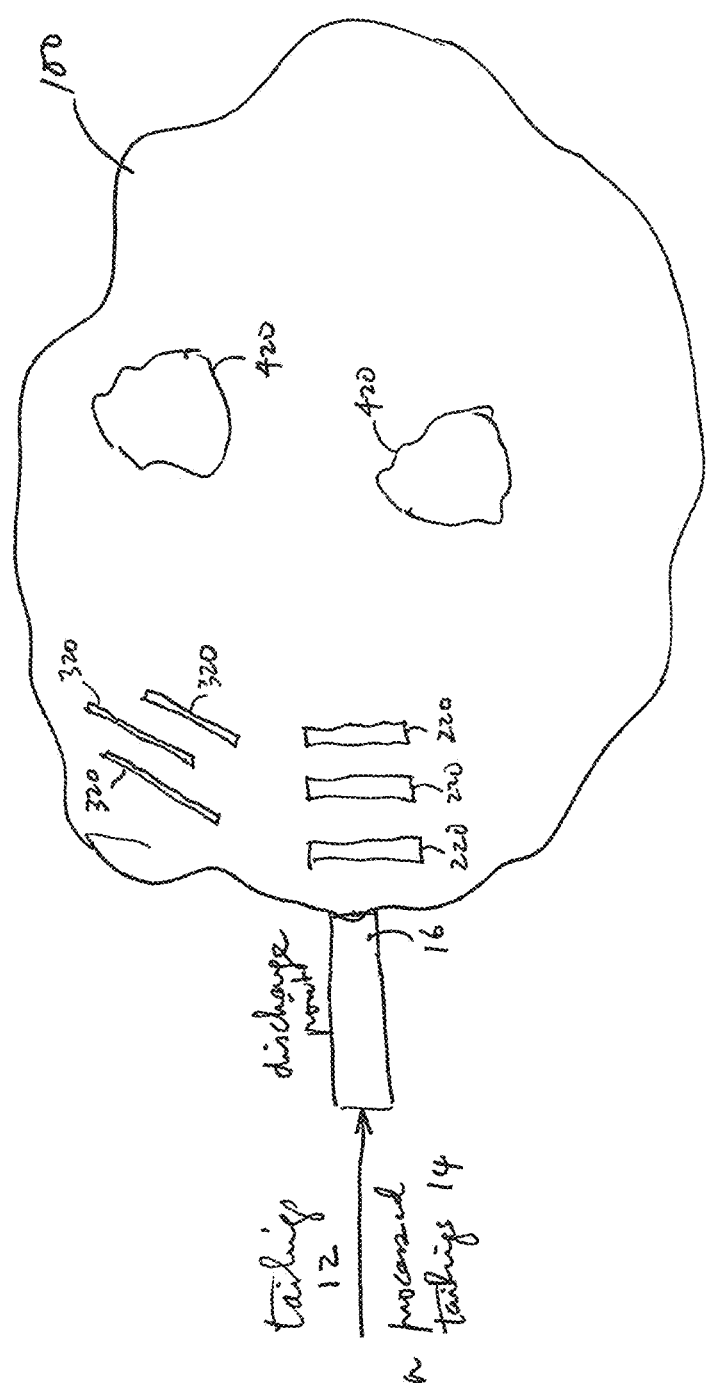
FIG. 13 illustrates a tailings pond wherein a plurality of functionalized polymer coated surfaces configured to attract the valuable material in the pond, according to some embodiments of the present invention.

FIG. 13 illustrates a tailings pond wherein a plurality of functionalized polymer coated surfaces may be configured to attract the valuable material of interest in the pond. As shown in FIG. 13, tailings 12 (FIG. 2a) or processed tailings (FIGS. 2b-3c) may be discharged into the tailings pond 100 at a discharge point 16. A plurality of filters 220 can be placed near the discharge point 16 to collect the valuable material of interest in the tailings 12 or processed tailings 14 in the pond. It is also possible to place a plurality of collection plates 320 and a plurality of sacks 420 in the pond to collect the valuable material therein. The filters 220, the collection plates 320 and the sacks 420 may be moved around in order to increase the contact between the valuable material and the functionalized polymer provided in the filters 220, collection plates 320 and sacks 420.

Figure 14:
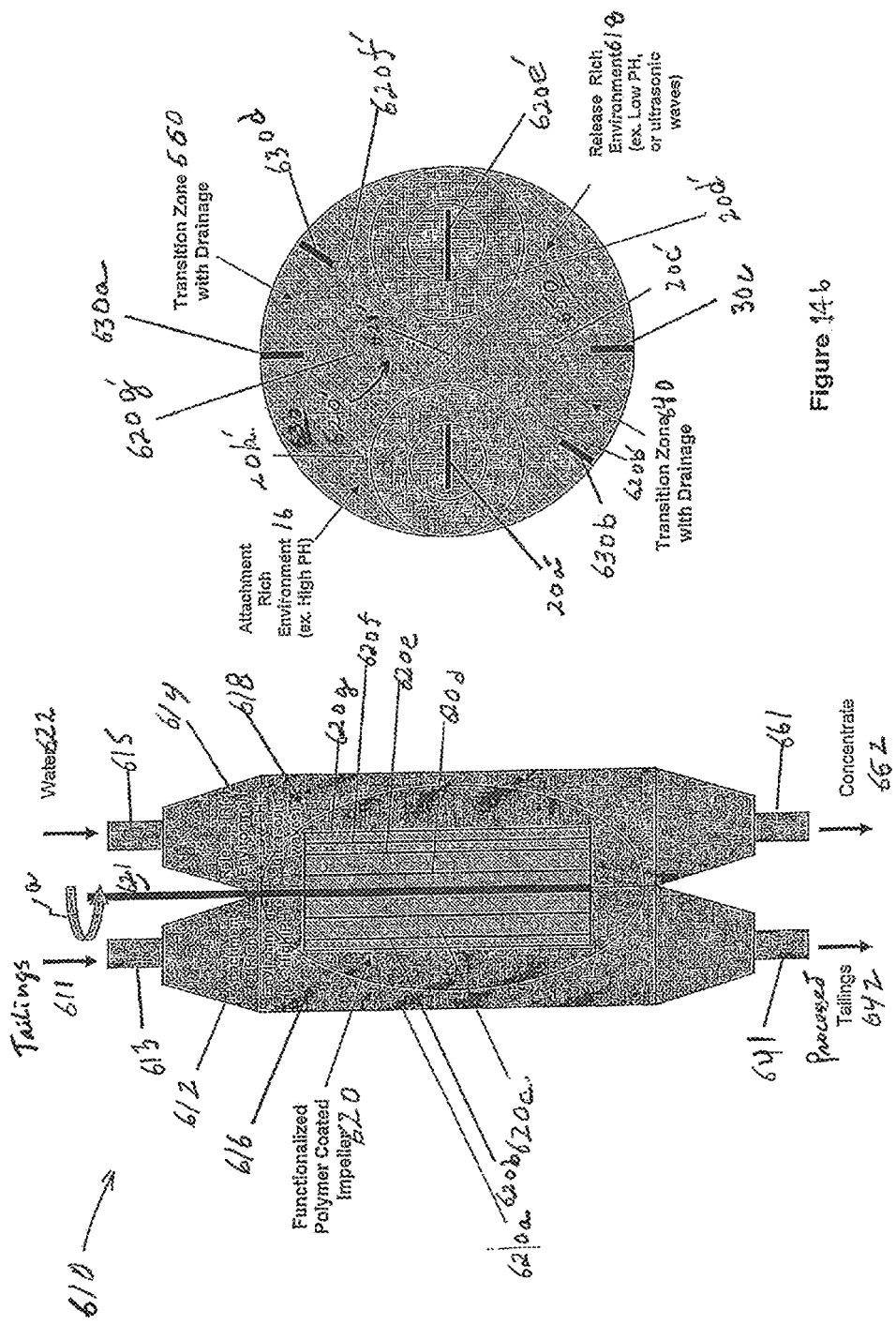
FIG. 14 includes

FIGS. 14, 14a, 14b

By way of example, FIG. 14 shows the present invention is the form of a machine, device, system or apparatus 610, e.g., for separating valuable material from unwanted material in a mixture 611, such as tailings, using a first processor 612 and a second processor 614. The first processor 612 and the second processor 614 may be configured with a functionalized polymer coated member that is shown, e.g., as a functionalized polymer coated impeller 620 (FIG. 14a), 620' (FIG. 14b), according to some embodiments of the present invention. In operation, the impeller 620, 620' slowly rotates in relation to the first processor 612 and the second processor 614, the impeller blades slowly pass through the attachment rich environment 616 in the first processor 612 where the valuable material is attached to the blades and through the release rich environment 618 in the second processor 614 is released from the blades. By way of example, the impeller 620 is shown rotating in a counterclockwise direction as indicated by arrow a, although the scope of the invention is not intended to be limited to the direction of the impeller rotation, or the manner in which the functionalized polymer coated impeller 620 (FIG. 14a), 620' (FIG. 14b) is arranged, mounted, or configured in relation to the first processor 612 and the second processor 614.

The first processor 612 may take the form of a first chamber, tank, cell or column that contains an attachment rich environment generally indicated as 616. The first chamber, tank or column 612 may be configured to receive via piping 613 the mixture or tailings 611 in the form of fluid (e.g., water), the valuable material and the unwanted material in the attachment rich environment 616, e.g., which has a high pH, conducive to attachment of the valuable material. The second processor 614 may take the form of a second chamber, tank, cell or column that contains a release rich environment generally indicated as 618. The second chamber, tank, cell or column 614 may be configured to receive via piping 615, e.g., water 622 in the release rich environment 618, e.g., which may have a low pH or receive ultrasonic waves conducive to release of the valuable material. Attachment rich environments like that forming part of element environment 616 conducive to the attachment of a valuable material of interest and release rich environments like that forming part of environment 618 conducive to the release of the valuable material of interest are known in the art, and the scope of the invention is not intended to be limited to any particular type or kind thereof either now known or later developed in the future. Moreover, a person skilled in the art would be able to formulate an attachment rich environment like environment 616 and a corresponding release rich environment like environment 618 based on the separation technology disclosed herein for any particular valuable mineral of interest, e.g., copper, forming part of any particular mixture or tailings.

In operation, the first processor 612 may be configured to receive the mixture or tailings 611 of water, valuable material and unwanted material and the functionalized polymer coated member that is configured to attach to the valuable material in the attachment rich environment 616. In FIG. 14, the functionalized polymer coated member is shown as the functionalized polymer coated impeller 620 (FIG. 14a), 620' (FIG. 14b). In FIG. 14a, the functionalized polymer coated impeller 620 has a shaft 621 and at least one impeller blade 620a, 620b, 620c, 620d, 620e, 620f, 620g and is configured to rotate slowly inside the first processor 612 and the second processor 614. In FIG. 14b, the functionalized polymer coated impeller 620' has a shaft 621' and impeller blades 620a', 620b', 620c', 620d', 620e', 620f', 620g' and 620h'. Each impeller blade in FIG. 14 is understood to be configured and functionalized with a polymer coating to attach to the valuable material in the attachment rich environment 616. (The scope of the invention is not intended to be limited to the number of blades on the impeller 620, 620' and the embodiment in FIGS. 14a and 14b is shown with impellers 621, 621' having a different number of blades.)

In FIG. 14, the first processor 612 is configured to receive at least one impeller blade of the functionalized polymer coated impeller 620 (FIG. 14a), 620' (FIG. 14b). In FIG. 1b, the at least one impeller blade is shown as impeller blade 620g' being received in an attachment zone 630 that forms part of the attachment rich environment 616 defined by walls 30a, 30b. The first processor 612 may also be configured with a first transition zone generally indicated as 640 to provide drainage from piping 641 of, e.g., processed tailings 642 as shown in FIG. 14a.

The first processor 612 may also be configured to provide at least one enriched impeller blade having the valuable material attached thereto, after passing through the attachment rich environment 616. In FIG. 14b, the at least one enriched impeller blade is shown as the at least one enriched impeller blade 620c' being provisioned from the attachment rich environment 616 in the first processor 612 to the release rich environment 618 in the second processor 614.

The second processor 614 may be configured to receive via the piping 615 the fluid 622 (e.g. water) and the enriched functionalized polymer coated member to release the valuable material in the release rich environment 618. In FIG. 14b, the second processor 614 is shown receiving the enriched impeller blade 620c' in a release zone 650, e.g., that forms part of the release rich environment 618 and is defined, e.g., by walls 630c and 630d.

The second processor 614 may also be configured to provide the valuable material that is released from the enriched functionalized polymer coated member into the release rich environment 618. For example, in FIG. 14b the second processor 614 is shown configured with a second transition zone 660 defined by walls 630a and 630d to provide via piping 661 drainage of the valuable material in the form of a concentrate 662 (FIG. 14a).

Figure 15:
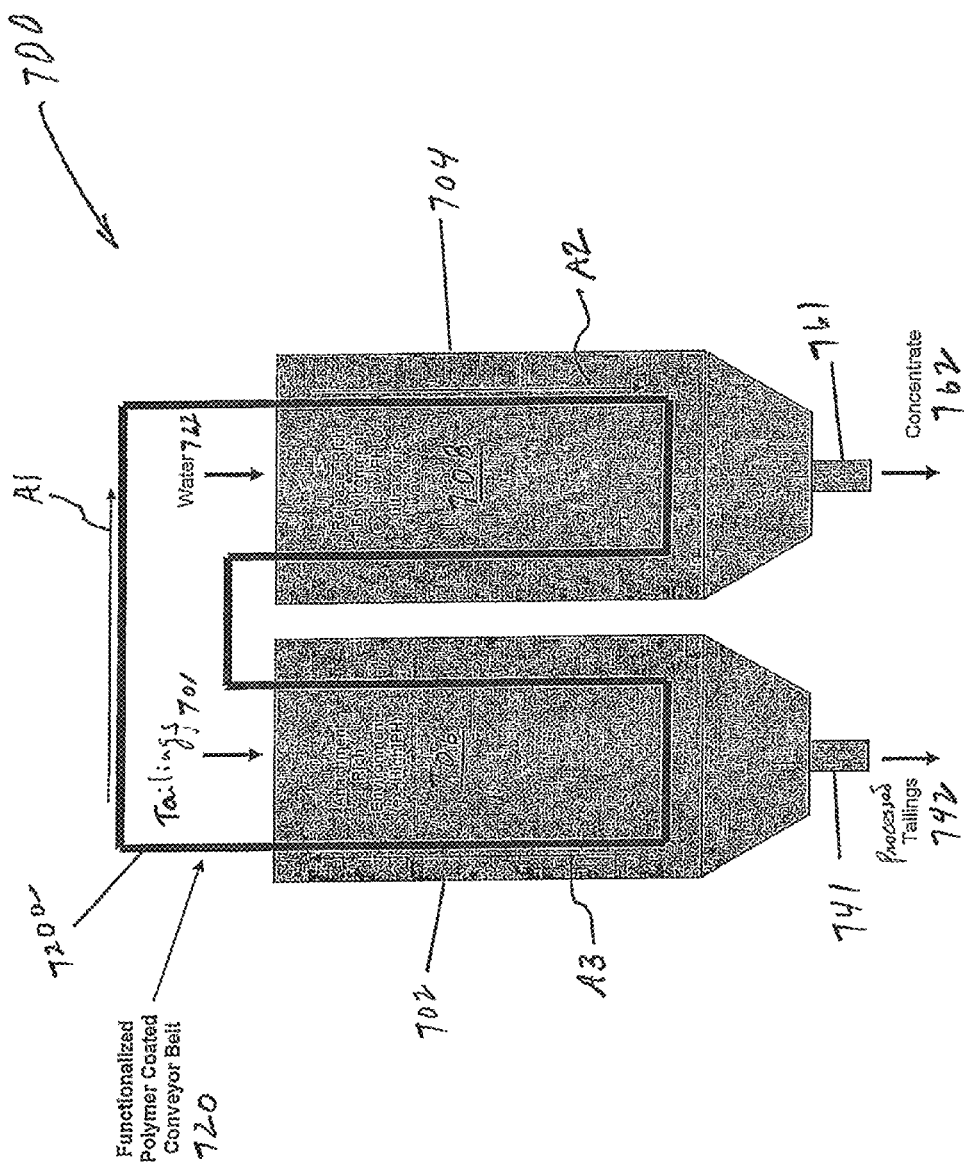
FIG. 15 is diagram of a separation processor configured with two chambers, tanks or columns having a functionalized polymer coated conveyor belt arranged therein, according to some embodiments of the present invention.

FIG. 15: The Functionalized Polymer Coated Conveyor Belt

By way of example, FIG. 15 shows the present invention is the form of a machine, device, system or apparatus 700, e.g., for separating valuable material from unwanted material in a mixture 701, such as a tailings, using a first processor 702 and a second processor 704. The first processor 702 and the second processor 704 are configured with a functionalized polymer coated member that is shown, e.g., as a functionalized polymer coated conveyor belt 720 that runs between the first processor 702 and the second processor 704, according to some embodiments of the present invention. The arrows A1, A2, A3 indicate the movement of the functionalized polymer coated conveyor belt 720. Techniques, including motors, gearing, etc., for running a conveyor belt like element 720 between two processors like elements 702 and 704 are known in the art, and the scope of the invention is not intended to be limited to any particular type or kind thereof either now know or later developed in the future. According to some embodiments of the present invention, the functionalized polymer coated conveyor belt 720 may be made of a mesh material.

The first processor 702 may take the form of a first chamber, tank, cell or column that contains an attachment rich environment generally indicated as 706. The first chamber, tank or column 702 may be configured to receive the mixture or tailings 701 in the form of fluid (e.g., water), the valuable material and the unwanted material in the attachment rich environment 706, e.g., which has a high pH, conducive to attachment of the valuable material. The second processor 704 may take the form of a second chamber, tank, cell or column that contains a release rich environment generally indicated as 708. The second chamber, tank, cell or column 704 may be configured to receive, e.g., water 722 in the release rich environment 708, e.g., which may have a low pH or receive ultrasonic waves conducive to release of the valuable material. Consistent with that stated above, attachment rich environments like that forming part of element environment 706 conducive to the attachment of a valuable material of interest and release rich environments like that forming part of environment 708 conducive to the release of the valuable material of interest are known in the art, and the scope of the invention is not intended to be limited to any particular type or kind thereof either now known or later developed in the future. Moreover, a person skilled in the art would be able to formulate an attachment rich environment like environment 106 and a corresponding release rich environment like environment 708 based on the separation technology disclosed herein for any particular valuable mineral of interest, e.g., copper, forming part of any particular mixture or tailings.

In operation, the first processor 702 may be configured to receive the mixture or tailings 701 of water, valuable material and unwanted material and the functionalized polymer coated conveyor belt 720 that is configured to attach to the valuable material in the attachment rich environment 706. In FIG. 15, the belt 720 is understood to be configured and functionalized with a polymer coating to attach to the valuable material in the attachment rich environment 706.

The first processor 702 may also be configured to provide drainage from piping 741 of, e.g., processed tailings 742 as shown in FIG. 15.

The first processor 702 may also be configured to provide an enriched functionalized polymer coated conveyor belt having the valuable material attached thereto, after passing through the attachment rich environment 706. In FIG. 15, the enriched functionalized polymer coated conveyor belt is shown, e.g., as that portion or part 720a of the belt 720 being provisioned from the attachment rich environment 106 in the first processor 702 to the release rich environment 708 in the second processor 704. It is understood that some other portions or parts of the belt 720 may be enriched, including the portion or part immediately leaving the attachment rich environment 706, as well as the portion or part immediately entering the release rich environment 708.

The second processor 704 may be configured to receive the fluid 722 (e.g. water) and the portion 720a of the enriched functionalized polymer coated conveyor belt 720 to release the valuable material in the release rich environment 708.

The second processor 704 may also be configured to provide the valuable material that is released from the enriched functionalized polymer coated member into the release rich environment 708. For example, in FIG. 15 the second processor 704 is shown configured to provide via piping 761 drainage of the valuable material in the form of a concentrate 762.

In FIG. 15, the first processor 702 is configured with the functionalized polymer coated conveyor belt 720 passing through with only two turns inside the attachment rich environment 706. However, embodiments are envisioned in which the first processor 702 may be configured to process the functionalized polymer coated conveyor belt 720 using a serpentine technique for winding or turning the belt 720 one way and another way, back and forth, inside the first processor to maximize surface area of the belt inside the processor 702 and exposure of the belt 720 to the attachment rich environment 706.

Figure 16:
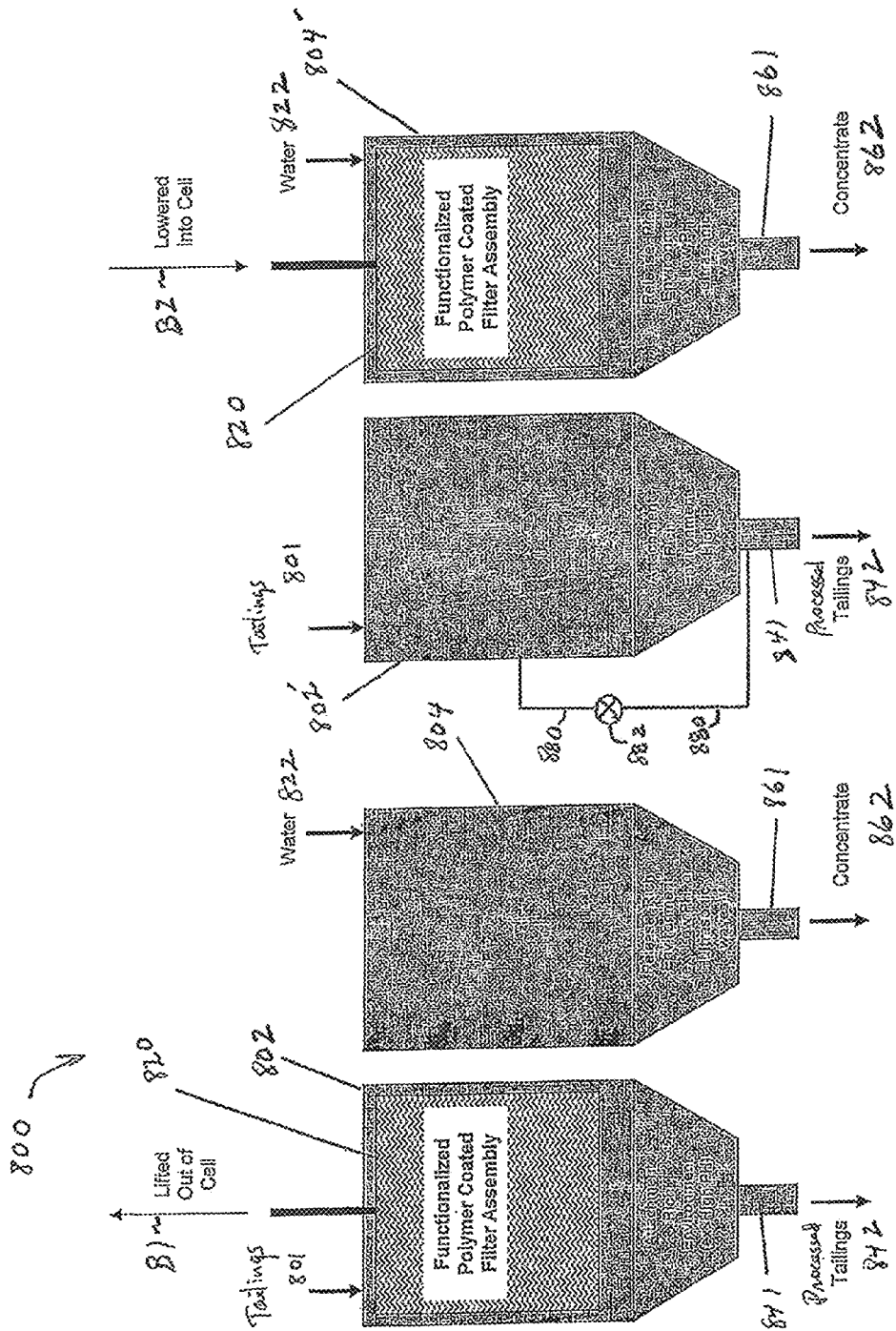
FIG. 16 is diagram of a separation processor configured with a functionalized polymer coated filter assembly for moving between two chambers, tanks or columns in a semi-continuous batch process, according to some embodiments of the present invention.

FIG. 16: The Functionalized Polymer Coated Filter

By way of example, FIG. 16 shows the present invention is the form of a machine, device, system or apparatus 800, e.g., for separating valuable material from unwanted material in a mixture 801, such as tailings, using a first processor 802, 802' and a second processor 804, 804'. The first processor 802 and the second processor 804 are configured to process a functionalized polymer coated member that is shown, e.g., as a functionalized polymer coated collection filter 820 configured to be moved between the first processor 802 and the second processor 804' as shown in FIG. 16 as part of a batch type process, according to some embodiments of the present invention. In FIG. 16, by way of example the batch type process is shown as having two first processor 802, 802' and second processor 804, 804, although the scope of the invention is not intended to be limited to the number of first or second processors. Moreover, embodiments are envisioned using a different number of first and second processor, different types or kinds of processors, as well as different types or kinds of processors both now known or later developed in the future. According to some embodiments of the present invention, the functionalized polymer coated collection filter 820 may take the form of a membrane or a thin soft pliable sheet or layer. The arrow B1 indicates the movement of the functionalized polymer coated filter 820 from the first processor 202, and the arrow B2 indicates the movement of the functionalized polymer coated collection filter 820 into the second processor 802. Techniques, including motors, gearing, etc., for moving a filter like element 820 from one processor to another processor like elements 802 and 804 are known in the art, and the scope of the invention is not intended to be limited to any particular type or kind thereof either now know or later developed in the future.

The first processor 802 may take the form of a first chamber, tank, cell or column that contains an attachment rich environment generally indicated as 806. The first chamber, tank or column 802 may be configured to receive the mixture or tailings 801 in the form of fluid (e.g., water), the valuable material and the unwanted material in the attachment rich environment 806, e.g., which has a high pH, conducive to attachment of the valuable material. The second processor 804 may take the form of a second chamber, tank, cell or column that contains a release rich environment generally indicated as 808. The second chamber, tank, cell or column 804 may be configured to receive, e.g., water 822 in the release rich environment 808, e.g., which may have a low pH or receive ultrasonic waves conducive to release of the valuable material. Consistent with that stated above, attachment rich environments like that forming part of element environment 806 conducive to the attachment of a valuable material of interest and release rich environments like that forming part of environment 808 conducive to the release of the valuable material of interest are known in the art, and the scope of the invention is not intended to be limited to any particular type or kind thereof either now known or later developed in the future. Moreover, a person skilled in the art would be able to formulate an attachment rich environment like environment 806 and a corresponding release rich environment like environment 808 based on the separation technology disclosed herein for any particular valuable mineral of interest, e.g., copper, forming part of any particular mixture or tailings.

In operation, the first processor 802 may be configured to receive the mixture or tailings 101 of water, valuable material and unwanted material and the functionalized polymer coated collection filter 820 that is configured to attach to the valuable material in the attachment rich environment 806. In FIG. 16, the functionalized polymer coated collection filter 620 is understood to be configured and functionalized with a polymer coating to attach to the valuable material in the attachment rich environment.

The first processor 802 may also be configured to provide drainage from piping 841 of, e.g., processed tailings 842 as shown in FIG. 16.

The first processor 802 may also be configured to provide an enriched functionalized polymer coated collection filter having the valuable material attached thereto, after soaking in the attachment rich environment. In FIG. 16, the enriched functionalized polymer coated collection filter 820 is shown, e.g., being provisioned from the attachment rich environment 806 in the first processor 202 to the release rich environment 808 in the second processor 204.

The second processor 804 may be configured to receive the fluid 822 (e.g. water) and the enriched functionalized polymer coated collection filter 820 to release the valuable material in the release rich environment 808.

The second processor 804 may also be configured to provide the valuable material that is released from the enriched functionalized polymer coated collection filter 220 into the release rich environment 808. For example, in FIG. 16 the second processor 804 is shown configured to provide via piping 861 drainage of the valuable material in the form of a concentrate 862.

The first processor 802' may also be configured with piping 880 and pumping 880 to recirculate the tailings 842 back into the first processor 802'. The scope of the invention is also intended to include the second processor 804' being configured with corresponding piping and pumping to recirculate the concentrate 862 back into the second processor 804'. Similar recirculation techniques may be implemented for the embodiments disclosed in relation to FIGS. 14-15 above.

The scope of the invention is not intended to be limited to the type or kind of batch process being implemented. For example, embodiments are envisioned in which the batch process may include the first and second processors 802, 804 being configured to process the enriched functionalized polymer coated collection filter 820 in relation to one type or kind of valuable material, and the first and second processors 802', 804' being configured to process the enriched functionalized polymer coated collection filter 820 in relation to either the same type or kind of valuable material, or a different type or kind of valuable material. Moreover, the scope of the invention is intended to include batch processes both now known and later developed in the future.

Polymer Surface Having Functional Groups

The term "polymer" in this disclosure means a large molecule made of many units of the same or similar structure linked together. In some embodiments of the present invention, the polymer surface on a filter has a plurality of molecules 73 (FIGS. 8*a*, 9*a*) having a functional group 78 (FIGS. 8*a*, 8*b*) to attract mineral particles 72 (FIGS. 8*a*, 9*a*). In these embodiments, the unit can be a monomer or an oligomer which forms the basis of, for example, polyamides (nylon), polyesters, polyurethanes, phenol-formaldehyde, urea-formaldehyde, melamine-formaldehyde, polyacetal, polyethylene, polyisobutylene, polyacrylonitrile, poly(vinyl chloride), polystyrene, poly(methyl methacrylates), poly(vinyl acetate), poly(vinylidene chloride), polyisoprene, polybutadiene, polyacrylates, poly(carbonate), phenolic resin, polydimethylsiloxane and other organic or inorganic polymers. Thus, the synthetic material can be hard or rigid like plastic or soft and flexible like an elastomer. While the physical properties of the synthetic beads can vary, the surface of the synthetic beads is chemically functionalized to provide a plurality of functional groups to attract mineral particles. The terms "valuable material" and "mineral particle" are used herein interchangeably. It is possible to use a molecule or molecular segment 76 (FIG. 8*a*, 9*a*) to attach a function group 78 to the polymer surface. In general, the molecule 76 can be a hydrocarbon chain, for example, and the functional group 78 can be an ion or charge species for bonding to a mineral, such as copper to the surface 74. A xanthate, for example, has both the functional group 78 and the molecular segment 76 to be incorporated into the polymer that is used to make the synthetic bead 70. A functional group 78 is also known as a collector that is either ionic or non-ionic. The ion can be anionic or cationic. An anion includes, but not limited to, oxyhydryl, such as carboxylic, sulfates and sulfonates, and sulfhydral, such as xanthates and dithiophosphates. Other molecules or compounds that can be used to provide the function group 78 include thionocarboamates, thioureas, xanthogens, monothiophosphates, hydroquinones and polyamines. Similarly, a chelating agent can be incorporated into the polymer as a collector site for attracting a mineral, such as copper. A surface having a functionalized polymer is also referred herein as synthetic surface.

Polymer Having Molecules to Render a Surface Hydrophobic

In some embodiments of the present invention, at least the surface of a filter surface is functionalized so that the surface is hydrophobic. It is possible to functionalize a polymer surface to have a plurality of molecules 79 (FIGS. 8*b*, 8*c*, 9*b*, 9*c*) to render the surface hydrophobic. A hydrophobic surface tends to attract hydrophobic molecules.

In chemistry, hydrophobicity is the physical property of a molecule (known as a hydrophobe) that is repelled from a mass of water. Hydrophobic molecules tend to be non-polar and, thus, prefer other neutral molecules and non-polar solvents. Hydrophobic molecules in water often cluster together. According to thermodynamics, matter seeks to be in a low-energy state, and bonding reduces chemical energy. Water is electrically polarized, and is able to form hydrogen bonds internally, which gives it many of its unique physical properties. But, since hydrophobes are not electrically polarized, and because they are unable to form hydrogen bonds, water repels hydrophobes, in favor of bonding with itself. It is this effect that causes the hydrophobic interaction.

The hydrophobic effect is the observed tendency of non-polar substances to aggregate in aqueous solution and exclude water molecules. It can be observed as the segregation and apparent repulsion between water and non-polar substances. The hydrophobic interaction is mostly an entropic effect originating from the disruption of highly dynamic hydrogen bonds between molecules of liquid water by the non-polar solute. A hydrocarbon chain or a similar non-polar region or a big molecule is incapable of forming hydrogen bonds with water. The introduction of such a non-hydrogen bonding surface into water causes disruption of the hydrogen bonding network between water molecules. The hydrogen bonds are reoriented tangential to such a surface to minimize disruption of the hydrogen bonded 3D network of water molecules and thus leads to a structured water "cage" around the nonpolar surface. The water molecules that form the "cage" (or solvation shell) have restricted mobilities. For example, in the case of larger non-polar molecules the reorientational and translational motion of the water molecules in the solvation shell may be restricted by a factor of two to four. Generally, this leads to significant losses in translational and rotational entropy of water molecules and makes the process unfavorable in terms of free energy of the system. By aggregating together, nonpolar molecules reduce the surface area exposed to water and minimize their disruptive effect.

The desired mineral is rendered hydrophobic by the addition of a surfactant or collector chemical. To be effective on tailings, the collectors are chosen based upon their selective wetting of the types of particles to be separated. A good collector will adsorb, physically or chemically, with one of the types of particles.

Collectors

Collectors either chemically bond (chemisorption) on a hydrophobic mineral surface, or adsorb onto the surface in the case of, for example, coal flotation through physisorption. Collectors increase the hydrophobicity of the surface, increasing the separability of the hydrophobic and hydrophilic particles. The hydrophobic particles of interest, according to the present invention, are depicted as particles 71', 72' in FIGS. 8b, 8c, 9b and 9c.

Figure 17B:
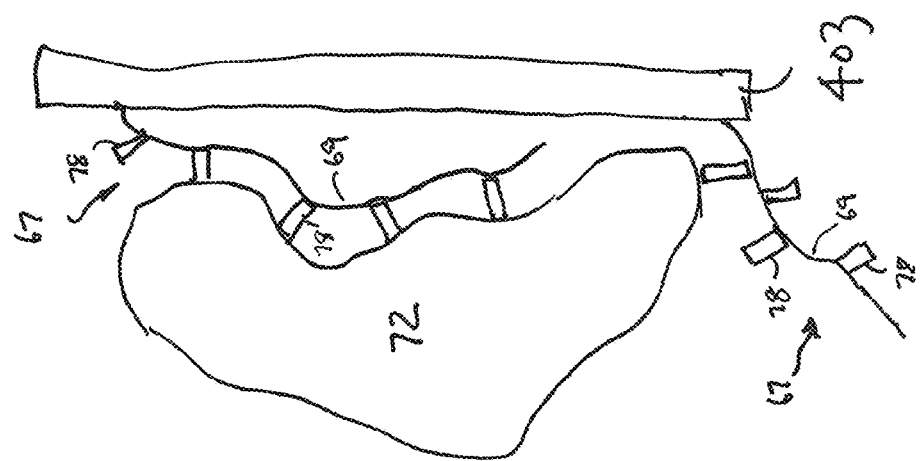
FIG. 17b shows a large mineral particle is attracted to a plurality of functional groups provided on a backbone of a molecule, according to some embodiments of the present invention.
Figure 17A:
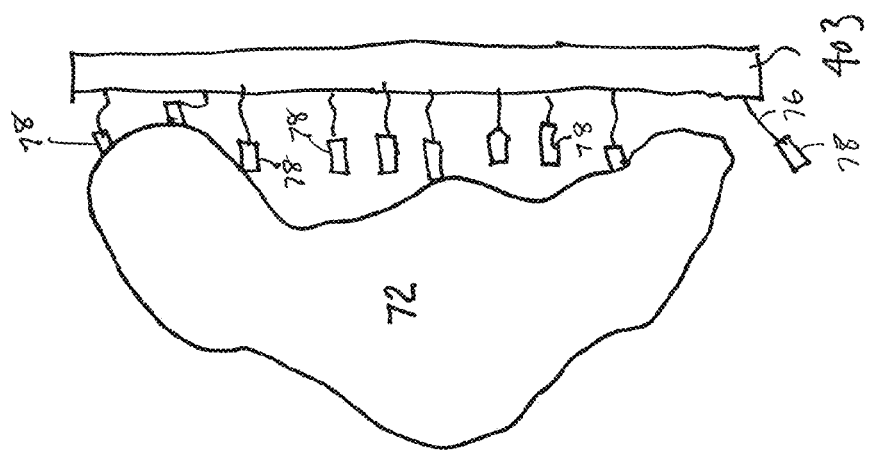
FIG. 17a shows a large mineral particle is attracted to a plurality of functional groups provided on a surface of a filter, according to some embodiments of the present invention.

FIGS. 17a-17c: Large Mineral Particles

It should be noted that the mineral particles in the tailings can be relatively large as compared to the mineral particles recovered in the flotation process. Some mineral particles may be larger than 200 μm, for example. It is likely that a large mineral particle requires more bonding forces so that it can be attached to a functionalized surface. As shown in FIG. 17a, the mineral particle 72 is attached to the filter surface 403 by the attraction of many function groups 78. In order to increase the bonding forces between the filter surface 403 and the mineral particle 72, it is possible to functionalize the surface 403 with molecules 67 comprising a plurality of functional groups 78 attached to a flexible backbone or chain 69. As such, many more functional groups 78 can be drawn to the surface of the mineral particle 72, as shown in FIG. 17b. FIG. 17c shows a large wetted mineral particle 72' is attracted or attached to the filter surface 403 which is render hydrophobic by molecules 79.

Figure 18B:
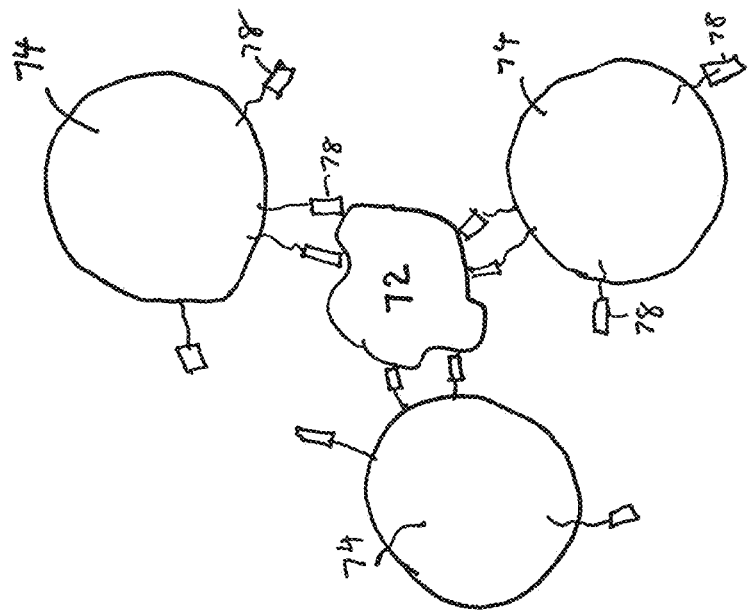
FIG. 18b illustrates a mineral particle being attached to a number of slightly larger synthetic beads at the same time, according to some embodiments of the present invention.
Figure 18A:
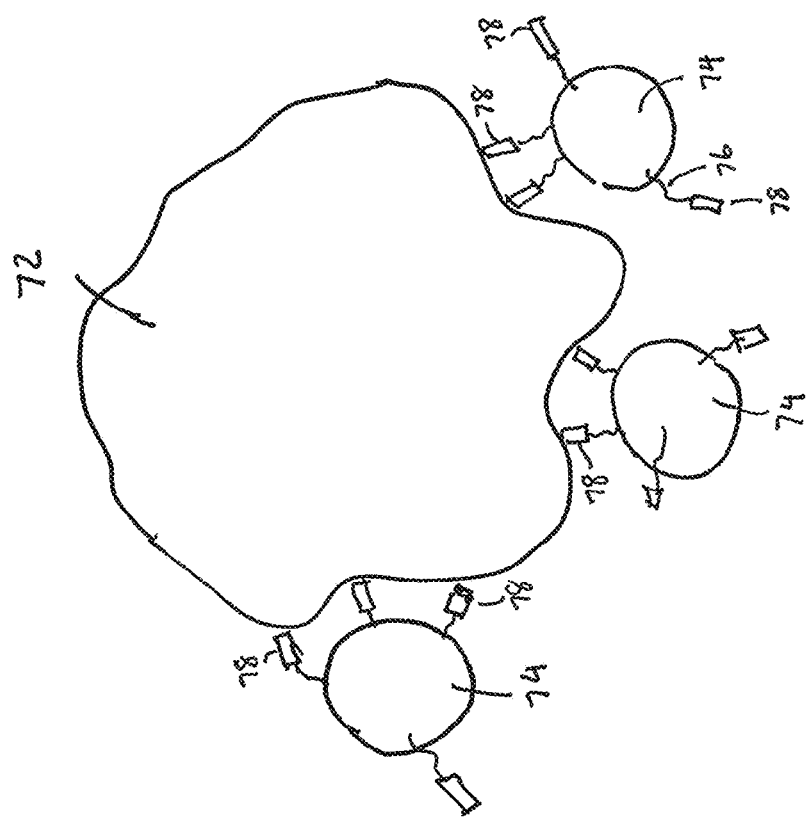
FIG. 18a illustrates a mineral particle being attached to a number of much smaller synthetic beads at the same time, according to some embodiments of the present invention.

FIG. 18a illustrates a scenario where a mineral particle 72 is attached to a number of synthetic beads 74 at the same time. Thus, although the synthetic beads 74 are much smaller in size than the mineral particle 72, a number of synthetic beads 74 may be able to lift the mineral particle 72 upward in a flotation cell. Likewise, a smaller mineral particle 72 can also be lifted upward by a number of synthetic beads 74 as shown in FIG. 18b. In order to increase the likelihood for this "cooperative" lifting to occur, a large number of synthetic beads 74 can be mixed into the slurry. Unlike air bubbles, the density of the synthetic beads can be chosen such that the synthetic beads may stay along in the slurry before they rise to surface in a flotation cell.

Figure 19B:
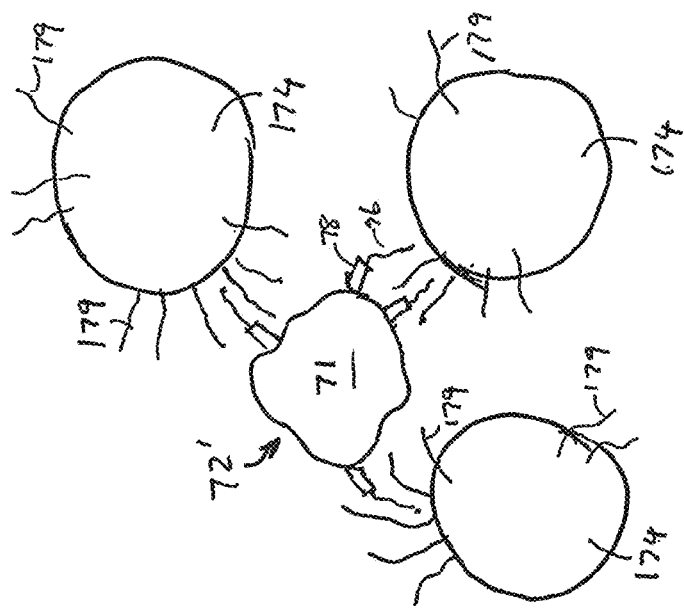
FIG. 19b illustrates a wetted mineral particle being attached to a number of slightly larger hydrophobic synthetic beads at the same time, according to some embodiments of the present invention.
Figure 19A:
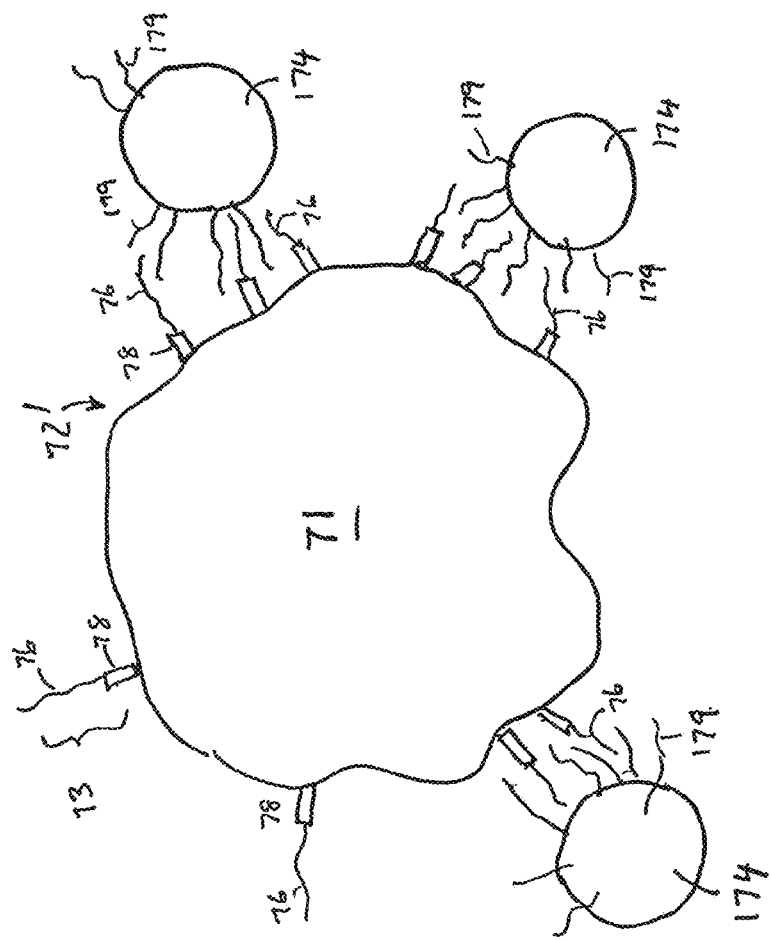
FIG. 19a illustrates a wetted mineral particle being attached to a number of much smaller hydrophobic synthetic beads at the same time, according to some embodiments of the present invention.

FIGS. 19a and 19b illustrate a similar scenario. As shown, a wetted mineral particle 172 is attached to a number of hydrophobic synthetic beads 174 at the same time.

APPLICATIONS

The scope of the invention is described in relation to mineral separation, including the separation of copper from ore.

By way of example, applications are envisioned to include rougher, scavenger, cleaner and Rougher/scavenger separation cells in the production stream, replacing the traditional flotation machines.

Tailings scavenger cells are used to scavenge the unrecovered minerals from a tailings stream.

Tailings cleaning cell is used to clean unwanted material from the tailings stream before it is sent to the disposal pond.

Tailings reclamation machine that is placed in the tailings pond to recover valuable mineral that has been sent to the tailings pond.

It should be understood that the synthetic beads according to the present invention, whether functionalized to have a collector or functionalized to be hydrophobic, are also configured for use in oilsands separation—to separate bitumen from sand and water in the recovery of bitumen in an oilsands mining operation. Likewise, the functionalized filters and membranes, according to some embodiments of the present invention, are also configured for oilsands separation.

According to some embodiments of the present invention, the surface of a synthetic bead can be functionalized to have a collector molecule. The collector has a functional group with an ion capable of forming a chemical bond with a mineral particle. A mineral particle associated with one or more collector molecules is referred to as a wetted mineral particle. According to some embodiments of the present invention, the synthetic bead can be functionalized to be hydrophobic in order to collect one or more wetted mineral particles.

Other types or kinds of valuable material or minerals of interest, include gold, molybdenum, etc.

However, the scope of the invention is intended to include other types or kinds of applications either now known or later developed in the future.

The Scope of the Invention

It should be further appreciated that any of the features, characteristics, alternatives or modifications described regarding a particular embodiment herein may also be applied, used, or incorporated with any other embodiment described herein. In addition, it is contemplated that, while the embodiments described herein are useful for homogeneous flows, the embodiments described herein can also be used for dispersive flows having dispersive properties (e.g., stratified flow). Although the invention has been described and illustrated with respect to exemplary embodiments thereof, the foregoing and various other additions and omissions may be made therein and thereto without departing from the spirit and scope of the present invention.

What is claimed is:

1. A method comprising:
   providing collection apparatus having one or more collection surfaces made of ceramic, nylon or cotton, said one or more collection surfaces functionalized with a synthetic material comprising a plurality of molecules having a functional group configured to collect mineral particles of interest to said one or more collection surfaces of the collection apparatus; and causing the collection apparatus to contact with tailings having the mineral particles of interest, including the tailings from a flotation process, wherein the synthetic material is selected from a group consisting of a siloxane derivative, polydimethylsiloxane, polysiloxanates, hydroxyl-terminated polydimethylsiloxanes, alkylsilane and fluoroalkylsilane.

2. The method according to claim 1, wherein the functional group comprises an ion for bonding the mineral particles of interest to the molecules.

3. The method according to claim 1, wherein the functional group is configured to render said one or more collection surfaces of the collection apparatus hydrophobic.

4. The method according to claim 1, wherein the mineral particles of interest have one or more hydrophobic molecular segments attached thereon.

5. The method according to claim 4, further comprising: providing collector molecules in the tailings, each collector molecule comprising a first end and a second end, the first end comprising the functional group configured to attach to the mineral particles of interest, the second end comprising a hydrophobic molecular segment.

6. The method according to claim 5, wherein the collector molecules comprise xanthates.

7. The method according to claim 1, wherein the method comprises discharging the tailings to a discharge area, and causing the collection apparatus to contact with the tailings before the tailings are discharged.

8. The method according to claim 1, wherein the collection apparatus comprises a plurality of passage ways, wherein the passage ways comprise said one or more collection surfaces configured with the synthetic material, said method further comprising:
causing at least part of the tailings to move through the passage ways so as to allow the mineral particles of interest to contact with the molecules on said one or more collection surfaces in the passage ways.

9. The method according to claim 8, wherein the passage ways comprise a plurality of fibers for providing said one or more collection surfaces.

10. The method according to claim 1, wherein the collection apparatus comprises a collection plate having said one or more collection surfaces configured with the synthetic material, said method further comprising:
causing at least part of the tailings to move over the collection plate so as to allow the mineral particles of interest to contact with the molecules said one or more collection surfaces.

11. The method according to claim 1, wherein the collection apparatus comprises a plurality of solid-phase bodies for providing said one or more collection surfaces configured with the synthetic material.

12. The method according to claim 1, wherein the collection apparatus is configured to contact the tailings over a period of time for providing one or more enriched collection surfaces containing the mineral particles, said method further comprising:
separating the collection apparatus from the tailings; and releasing the mineral particles of interest from said one or more enriched collection surfaces.

13. The method according to claim 12, wherein said releasing comprises contacting said one or more enriched collection surfaces with a liquid having a pH value ranging from 0 to 7.

14. The method according to claim 12, wherein said releasing comprises at least partially submerging said one or more enriched collection surfaces in a liquid and applying ultrasound waves in the liquid for providing ultrasonic agitation over the enriched collection surface.

15. A system, comprising:
a collection processor configured to receive tailings of a flotation process, the tailings having mineral particles of interest;
at least one collection apparatus located in the collection processor, the collection apparatus comprising one or more collection surfaces made of ceramic, nylon or cotton, said one or more collection surfaces functionalized with a synthetic material, the synthetic material comprising a plurality of molecules having a functional group configured to attract the mineral particles of interest to said one or more collection surfaces, wherein the synthetic material is selected from a group consisting of a siloxane derivative, polydimethylsiloxane, polysiloxanates, hydroxyl-terminated polydimethylsiloxanes, alkylsilane and fluoroalkylsilane.

16. The system according to claim 15, wherein the functional group comprises an ionizing bond for bonding the mineral particles of interest to the molecules.

17. The system according to claim 15, wherein the functional group is configured to render the collection area hydrophobic.

18. The system according to claim 17, wherein the mineral particles of interest have one or more hydrophobic molecular segments attached thereon, and the tailings have a plurality of molecules, each collector molecule comprising a first end and a second end, the first end comprising the functional group configured to attach to the mineral particles of interest, the second end comprising a hydrophobic molecular segment.

19. The system according to claim 15, wherein said one or more collection are configured to contact the tailings over a period of time for providing one or more enriched collection surfaces in the collection apparatus, containing the mineral particles of interest, said system further comprising:
a release processor configured to receive the collection apparatus having said one or more enriched collection surfaces, the release processor further configured to provide a release medium for releasing the mineral particles of interest from said one or more enriched collection surfaces.

20. The system according to claim 19, wherein said release medium comprises a liquid configured to contact with said one or more enriched collection surfaces, the liquid having a pH value ranging from 0 to 7.

21. The system according to claim 19, wherein said release medium comprises a liquid configured to contact with said one or more enriched collection surfaces, said system further comprising:
an ultrasound source configured to apply ultrasound waves to said one or more enriched collection surfaces for releasing the mineral particles of interest from said one or more enriched collection surfaces.

22. The system according to claim 15, where a part of said one or more collection surfaces is configured to have the molecules attached thereto, wherein the molecules comprise collectors.

23. The system according to claim 22, where another part of said one or more collection surfaces is configured to be hydrophobic.

24. The system according to claim 15, where a part of said one or more collection surfaces is configured to be hydrophobic.

\* \* \* \* \*